(12) United States Patent
Mitra et al.

(10) Patent No.: US 9,660,845 B2
(45) Date of Patent: May 23, 2017

(54) SYSTEM AND METHOD FOR STATE REDUCTION IN TRELLIS EQUALIZERS USING BOUNDED STATE ENUMERATION

(71) Applicant: Huawei Technologies Co., Ltd., Shenzhen (CN)

(72) Inventors: Jeebak Mitra, Ottawa (CA); Zhuhong Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/876,378

(22) Filed: Oct. 6, 2015

(65) Prior Publication Data
US 2017/0099165 A1  Apr. 6, 2017

(51) Int. Cl.
*H01L 23/02* (2006.01)
*H04L 25/03* (2006.01)

(52) U.S. Cl.
CPC  *H04L 25/03203* (2013.01); *H04L 2025/0342* (2013.01)

(58) Field of Classification Search
CPC .... H04L 1/006; H04L 1/0054; H04L 1/0065; H04L 1/0071; H04L 1/0041
USPC .......................... 375/259–265, 316, 340–341
See application file for complete search history.

(56) References Cited

U.S. PATENT DOCUMENTS

| | | | | | |
|---|---|---|---|---|---|
| 4,713,829 A | * | 12/1987 | Eyuboglu | ............ | H03M 13/25 329/311 |
| 5,052,000 A | * | 9/1991 | Wang | .................... | H04L 1/0047 375/233 |
| 5,541,955 A | * | 7/1996 | Jacobsmeyer | ......... | H03D 3/241 375/222 |
| 5,787,129 A | * | 7/1998 | Willming | ............ | H03M 13/256 375/341 |

(Continued)

FOREIGN PATENT DOCUMENTS

CN  102461107 A  5/2012

OTHER PUBLICATIONS

Eyuboglu, M., et al., "Reduced-State Sequence Estimation for Coded Modulation of Intersymbol Interference Channels," IEEE Journal on Selected Areas in Communications, vol. 7, No. 6, Aug. 1989, pp. 989-995.

(Continued)

*Primary Examiner* — James M Perez
(74) *Attorney, Agent, or Firm* — Slater Matsil, LLP

(57) ABSTRACT

Embodiment reduced-state trellis equalization techniques compute accumulated path metrics (APMs) for a subset of candidate states for at least some stages in the trellis based on a neighborhood map of an ML state. This reduces the number of APMs that are computed and stored during trellis equalization. Other embodiments select a subset of candidate states for which APMs are transported to the next stage of the trellis based on the neighborhood map. This eliminates the need to sort the remaining APMs during reduced (Continued)

state trellis equalization. The neighborhood map identifies a subset of the highest probability neighbors for an ML state. The subset of candidate states identified as highest probability neighbors may be saved in a look-up table. The look-up table may be generated offline and/or generated/updated dynamically during run-time operation.

20 Claims, 14 Drawing Sheets

(56) References Cited

U.S. PATENT DOCUMENTS

| | | | | |
|---|---|---|---|---|
| 6,233,290 | B1* | 5/2001 | Raphaeli | H03M 13/39 375/262 |
| 6,327,317 | B1* | 12/2001 | Chennakeshu | H04L 1/0057 375/262 |
| 6,970,522 | B1* | 11/2005 | Morling | G11B 20/10046 369/275.3 |
| 7,380,199 | B2* | 5/2008 | Haratsch | H04L 25/03235 375/262 |
| 7,487,432 | B2* | 2/2009 | Ashley | G11B 20/18 375/262 |
| 7,526,047 | B2* | 4/2009 | Lee | H04L 1/0618 375/265 |
| 7,558,343 | B2* | 7/2009 | Klingenbrunn | H04L 25/03203 375/341 |
| 7,583,763 | B2* | 9/2009 | Nissani (Nissensohn) | H04L 1/02 375/316 |
| 7,860,194 | B2* | 12/2010 | Kim | H04L 1/0052 375/262 |
| 7,974,335 | B2* | 7/2011 | Park | H04B 3/04 375/143 |
| 8,005,007 | B2* | 8/2011 | Feng | H04L 12/24 370/252 |
| 8,059,709 | B2* | 11/2011 | Abou Rjeily | H04B 1/7163 375/239 |
| 8,347,178 | B2* | 1/2013 | Geng | H03M 13/17 714/762 |
| 8,411,806 | B1* | 4/2013 | Lee | H04L 25/03305 375/340 |
| 8,446,995 | B2* | 5/2013 | Zeng | H04L 25/08 375/345 |
| 8,665,977 | B2* | 3/2014 | Cheng | H04L 25/03242 375/261 |
| 9,172,500 | B2* | 10/2015 | Riabkov | H04L 27/38 |
| 9,209,869 | B2* | 12/2015 | Suh | H04B 7/024 |
| 9,226,302 | B2* | 12/2015 | Suh | H04W 72/1226 |
| 9,325,450 | B2* | 4/2016 | Guerrieri | H04L 1/0054 |
| 9,385,896 | B1* | 7/2016 | Mitra | H04L 25/03197 |
| 9,401,826 | B2* | 7/2016 | Eitel | H04L 25/0238 |
| 9,503,305 | B1* | 11/2016 | Ma | H04L 27/36 |
| 9,537,683 | B1* | 1/2017 | Zamani | H04L 25/03273 |
| 2002/0172275 | A1* | 11/2002 | Birru | H04L 1/0054 375/233 |
| 2004/0128610 | A1* | 7/2004 | Wei | H03M 13/41 714/792 |
| 2006/0088119 | A1* | 4/2006 | Fu | H04L 1/0054 375/265 |
| 2006/0104391 | A1* | 5/2006 | Choi | H03M 13/2707 375/341 |
| 2007/0022357 | A1* | 1/2007 | Chiou | H04L 1/0054 714/755 |
| 2008/0056400 | A1* | 3/2008 | Hedayat | H03M 13/3994 375/265 |
| 2009/0052594 | A1* | 2/2009 | Li | H03M 13/373 375/341 |
| 2009/0060079 | A1 | 3/2009 | Choi et al. | |
| 2009/0129519 | A1* | 5/2009 | Azadet | H04L 25/03229 375/341 |
| 2009/0132872 | A1* | 5/2009 | Leung | H03M 13/27 714/701 |
| 2009/0235060 | A1 | 9/2009 | Yokokawa et al. | |
| 2010/0309796 | A1 | 12/2010 | Khayrallah | |
| 2012/0137198 | A1 | 5/2012 | Shi et al. | |
| 2014/0205020 | A1* | 7/2014 | Lou | H04N 19/56 375/240.26 |
| 2014/0294050 | A1* | 10/2014 | Hou | H04L 5/1453 375/222 |
| 2015/0098533 | A1* | 4/2015 | Rusek | H04B 1/1027 375/350 |
| 2016/0112065 | A1* | 4/2016 | Chang | H03M 13/3972 714/776 |
| 2016/0269214 | A1* | 9/2016 | Popovic | H04L 1/006 |
| 2017/0012712 | A1* | 1/2017 | Mitra | H04L 25/03197 |

OTHER PUBLICATIONS

Fettweis, G., et al., "High-Speed Parallel Viterbi Decoding: Algorithm and VLSI-Architecture," IEEE Communications Magazine, vol. 29, No. 5, May 1991, pp. 46-55.

Mihhailov, D., et al., "Parallel FPGA-Based Implementation of Recursive Sorting Algorithms," 2010 International Conference on Reconfigurable Computing and FPGAs (ReConFig), Dec. 13-15, 2010, pp. 121-126.

Thompson, C., "The VLSI Complexity of Sorting," IEEE Transactions on Computers, vol. C-32, No. 12, Dec. 1983, pp. 1171-1184.

* cited by examiner

SYSTEM AND METHOD FOR STATE REDUCTION IN TRELLIS EQUALIZERS USING BOUNDED STATE ENUMERATION

TECHNICAL FIELD

The present invention relates generally to decoding communication signals, and in particular embodiments, to techniques and mechanisms for state reduction in trellis equalizers using bounded state enumeration.

BACKGROUND

Higher symbol (baud) rates are likely to be implemented in next-generation networks to provide data rates in excess of 100 Gigabits per second (Gbps) over relatively long distances, e.g., 500 kilometers or more. Some network components may be unable to support such high symbol rates without introducing significant distortion into the signal. One form of signal distortion is inter-symbol interference (ISI), which occurs when leading symbols interfere with trailing symbols. ISI typically results when a signal is communicated over a dispersive channel, which causes individual pulses of symbols in the signal to appear smeared and/or broadened upon reception. The source of ISI is largely medium dependent. In wireless channels, ISI is primarily attributable to multipath propagation, which occurs when the wireless signal traverses multiple paths between the transmitter and receiver. In optical channels, ISI is primarily attributable to chromatic dispersion, which occurs when light of different wavelengths travels through the fiber at different speeds. Additionally, ISI may be attributable to the band-limited nature of optical front-ends and various network elements (e.g., wavelength selective switches (WSS). Excessive ISI can introduce errors into signal decoding at the receiver. Therefore, techniques for reducing ISI in high baud rate networks are desired.

Although ISI is an additive impairment introduced by the channel, impairment may also occur in the form of phase noise. For systems, that have a high data rate the phase noise may be correlated between two or more consecutive symbols. Techniques that help in mitigation of phase noise with memory are therefore also desired for high baud rate systems.

SUMMARY OF THE INVENTION

Technical advantages are generally achieved, by embodiments of this disclosure which describe techniques and mechanisms for state reduction in trellis equalizers using bounded state enumeration.

In accordance with an embodiment, a method for reduced state trellis equalization is provided. In this example, the method includes receiving a signal carrying at least a current symbol and a trailing symbol over a system exhibiting channel memory. The current symbol is received before the trailing symbol. The current symbol is mapped to a current stage of a trellis and the leading symbol is mapped to a next stage of the trellis. The method further includes selecting a subset of candidate states at the current stage of the trellis. The current stage of the trellis includes the subset of candidate states and one or more remaining candidate states that are excluded from the subset of candidate states. The method further includes computing a first set of accumulated path metrics (APMs) for the subset of candidate states without computing APMs for the one or more remaining candidate states, and decoding the trailing symbol using at least the subset of APMs for the subset of candidate states of the current stage. An apparatus for performing this method is also provided.

In accordance with another embodiment, another method for reduced state trellis equalization is provided. In this example, the method includes receiving a current symbol and a trailing symbol over a system exhibiting channel memory. The current symbol is received before the trailing symbol. The current symbol is mapped to a current stage of a trellis and the leading symbol is mapped to a next stage of the trellis. The method further includes computing APMs for candidate states at the current stage of the trellis, and identifying a maximum likelihood (ML) state of the current stage based on the APMs. The method further includes selecting a subset of candidate states based on a neighborhood map of the ML state without sorting APMs of neighboring candidate states of the ML state following identification of the ML state. The current stage includes the subset of candidate states and one or more remaining candidates excluded from the subset of candidate states. The method further includes decoding the trailing symbol at the next stage using APMs of the subset of candidate states of the current stage without using APMs of the one or more remaining candidate states excluded from the subset of candidate states. An apparatus for performing this method is also provided.

In accordance with another embodiment, yet another method for reduced state trellis equalization is provided. In this example, the method includes determining metrics of a channel exhibiting channel memory, and generating, or updating, a neighborhood map based on the metrics of the channel. The neighborhood map specifies a subset of candidate states associated with a maximum likelihood (ML) state. The method further includes receiving a signal carrying at least a current symbol and a trailing symbol over the channel, the current symbol being received before the trailing symbol, and performing reduced-state trellis equalization on the current symbol and the trailing symbol in accordance with the neighborhood map. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
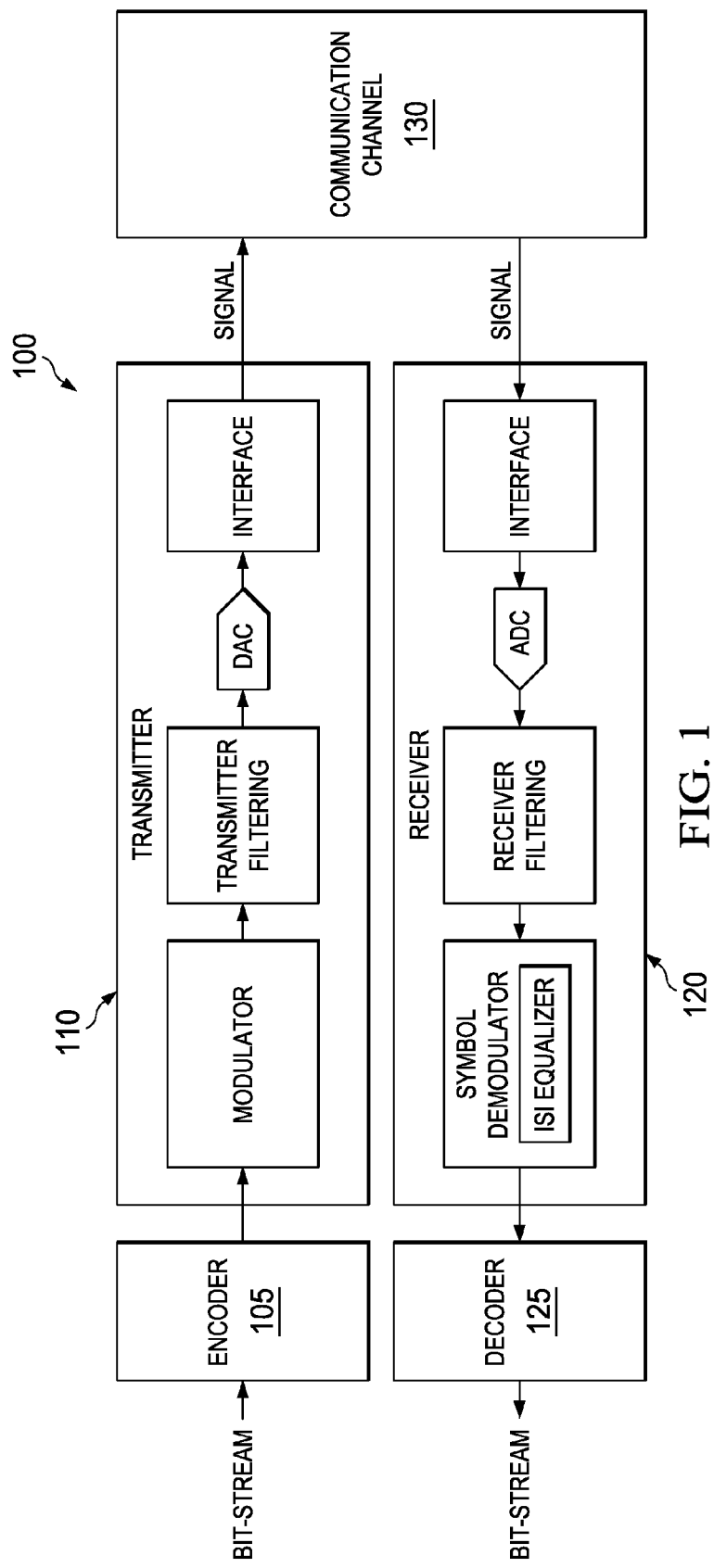
FIG. 1 is a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As discussed herein, the terms "leading symbol" and "trailing symbol" denote the relative position of the referenced symbols in the corresponding sequence of symbols. Thus, a given symbol (k) is a trailing symbol in reference to symbols (k−1, k−2 . . . k−n) positioned ahead of the given symbol (k) in the sequence of symbols. Likewise, the given symbol (k) is a leading symbol in reference to symbols (k+1, k+2 . . . k+n) positioned after the given symbol (k) in the sequence of symbols. Although the techniques described herein are discussed primarily in the context of ISI equalization, it should be appreciated that the underlying inventive concepts are equally applicable to reduced state trellis processing techniques that compensate for other types of channel impairments, e.g., multiplicative phase noise.

Equalization techniques may be used to reduce the effect of ISI in a signal. One type of ISI equalization technique, referred to as trellis equalization, arranges symbols at different stages of a trellis, and then computes accumulated path metrics (APMs) for candidate states of each symbol based on the maximum likelihood (ML) trellis state of the corresponding symbol as well as APMs of one or more earlier/leading symbols. The ML trellis state is the candidate state that corresponds to the ML value/measurement, and is referred to herein as the ML state. An APM for the kth symbol is constituted of the additive metrics of all the trellis stages leading up to the kth stage of the trellis. After APMs are computed for each stage of the trellis, the computed APMs are used to select a best path over the trellis after processing a sufficiently large number of symbols compared to the memory of the channel impairment. The channel impairment may manifest itself as an amplitude component, a phase component, or a combination thereof. The best path maps to a highest probability candidate state for each symbol in the sequence of symbols being evaluated.

The number of APMs that are computed and stored during trellis equalization significantly impacts the complexity and memory requirements of the equalizer. Conventional trellis equalization techniques compute APMs for all candidate states at each stage of the trellis, and propagate all of the computed APMs over the trellis to subsequent stages. Consequently, it may be relatively complex to implement conventional trellis equalization in systems that use higher-order constellations (e.g., 16 QAM) and/or exhibit substantial channel memory. Accordingly, more efficient trellis equalization techniques are desired to support high symbol rate requirements of next generation networks.

Disclosed herein are embodiment reduced-state trellis equalization techniques that compute APMs for a subset of candidate states for at least some stages in the trellis. For example, embodiment reduced-state trellis equalization techniques may compute APMs for eight candidate states at each stage of a trellis when evaluating 16 QAM symbols communicated over a system exhibiting a channel memory of two. In such an example, the number of APMs that are computed and stored is reduced by a factor of two. It should be appreciated that different efficiency savings may be achieved by embodiment reduced-state trellis equalization techniques that select different numbers of candidate states, evaluate different constellations (e.g., 8 QAM, 64 QAM), and/or evaluate symbols communicated over systems exhibiting different amounts of channel memory.

The subset of candidate states for which APMs are computed at a given stage may be selected based on a neighborhood map in an effective channel memory hyper-plane. The effective channel memory hyper-plane is a non-Euclidian space that includes a dimension for each symbol of channel memory. For example, the neighborhood map for a channel memory of n would be constructed as an n-dimensional hyperplane. The neighborhood map identifies a set of the highest probability neighbors for a state of the trellis. A neighborhood map may be generated for each potential ML state for a given received symbol, and the resulting subsets may be stored as entries of a look-up table. The look-up table may be generated offline to reduce the computational complexity of state reduction during real-time trellis equalization. Alternatively, the look-up table may be generated and/or updated dynamically during run-time operation of the reduced state trellis based on metrics of the channel. The construction of the neighborhood map may accommodate any kind of channel impairment that exhibit memory. In some embodiments, the impairments may be additive noise with memory. In some other embodiments, the impairment may be phase noise with memory. Techniques for constructing the neighborhood map, as well as other inventive aspects, are described in greater detail below.

FIG. 1 is a diagram of a communications system 100 in which a signal is communicated from a transmitter 110 to a receiver 120 over a communication channel 130. As shown, an encoder 105 encodes a bit-stream, and forwards the encoded bit-stream to the transmitter 110. The encoder 105 may use any type of encoding scheme, including a forward error correction (FEC) encoding scheme. The transmitter 110 then modulates the encoded bit-stream by mapping bits in the encoded bit stream to modulation symbols (e.g., QAM symbols, QPSK symbols), and performs additional signal processing steps (e.g., filtering, digital to analog conversion (DAC), amplification) to obtain a signal. The signal is then transmitted over the communication channel 130 to the receiver 120. The communication channel 130 may be any type of channel. In some embodiments, the communication channel 130 includes a wireless link/interface. In such embodiments, the transmitter 110 and the receiver 120 may communicate the signal in accordance with a wireless telecommunication protocol, such as long term evolution (LTE), Worldwide Interoperability for Microwave Access (Wi-MAX), or Wi-Fi telecommunications protocol. In other embodiments, the communication channel 130 includes a wireline link/interface, e.g., copper line, optical fiber.

Upon reception, the receiver 120 performs various processing steps on the signal (e.g., analog to digital conversion, filtering) prior to symbol demodulation. The de-modulated signal is then decoded at the decoder 125 to obtain a decoded bit-stream.

Notably, ISI equalization may be performed during, or after, symbol demodulation. Embodiments of this disclosure provide reduced-state trellis equalization techniques that reduce the number of APMs that are computed during ISI equalization. The demodulated symbols may be provided to the decoder 125, where bit-level decoding may be performed. It should be appreciated that the receiver 120 may include other components, such as components that perform symbol timing synchronization and carrier phase estimation and correction prior to symbol demodulation.

Figure 2:
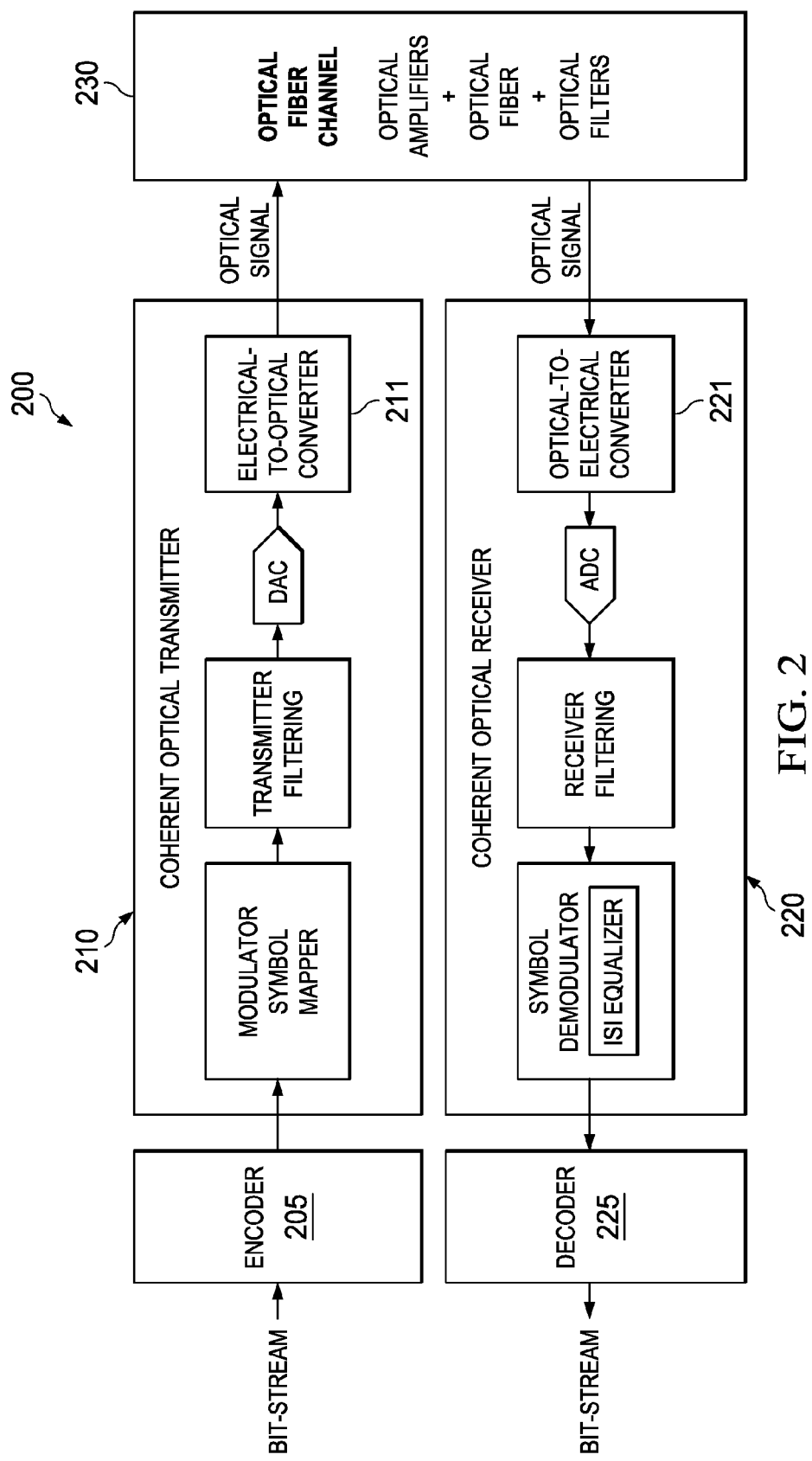
FIG. 2 is a diagram of a coherent optical communications system.

Embodiment ISI equalization techniques described herein can be implemented in coherent optical systems. FIG. 2 is a diagram of a coherent optical system 200 in which data is communicated from a coherent optical transmitter 210 to a coherent optical receiver 220 over an optical fiber channel 230. As shown, an encoder 205 encodes a bit-stream, and then forwards the encoded bit-stream to the coherent optical transmitter 210. The encoder 205 may be configured similarly to the encoder 105, and may use any type of encoding scheme, including forward error correction (FEC) encoding schemes. The coherent optical transmitter 210 then modulates the encoded bit-stream by mapping bits in the encoded bit stream to modulation symbols. The coherent optical transmitter 210 may also perform other signal processing steps (e.g., filtering, digital to analog conversion (DAC), amplification) prior to forwarding the signal to the electrical-to-optical converter 211. Although the electrical-to-optical converter 211 is depicted as being a component of the coherent optical transmitter 210, it should be appreciated that the electrical-to-optical converter 211 may be an independent component that is separate from the coherent optical transmitter 210 in some embodiments. The electrical-to-optical converter 211 may also be referred to as an optical-electrical front end.

The electrical-to-optical converter 211 converts the signal into an optical signal prior to the optical signal being transmitted over the optical fiber channel 230 to the coherent optical receiver 220. The coherent optical channel 230 includes various components, including optical amplifiers, optical fiber, and optical switches and filters. Components of the coherent optical channel 230 may introduce distortion into the optical signal, particularly when the coherent optical channel 230 is a bandwidth limited channel, e.g., a channel in which the frequency response is zero above a certain cutoff frequency.

Upon reception, the coherent optical receiver 220 converts the optical signal to an analog electrical signal at the optical-to-electrical converter 221. Similarly to the electrical-to-optical converter 211, the optical-to-electrical converter 221 may be an internal component of the coherent optical receiver 220, or an independent component that is separate from the coherent optical receiver 220. Thereafter, the coherent optical receiver 220 may perform various signal processing steps (e.g., analog to digital conversion, filtering) prior to symbol demodulation. ISI equalization may be performed during, or after, symbol demodulation using embodiment reduced-state trellis equalization techniques provided by this disclosure. In some embodiments, the coherent optical receiver 220 performs chromatic dispersion (CD) compensation and/or polarization mode dispersion (PMD) compensation using linear equalizers prior to ISI equalization. The decoder 225 may perform bit-level decoding following symbol demodulation.

Figure 3:
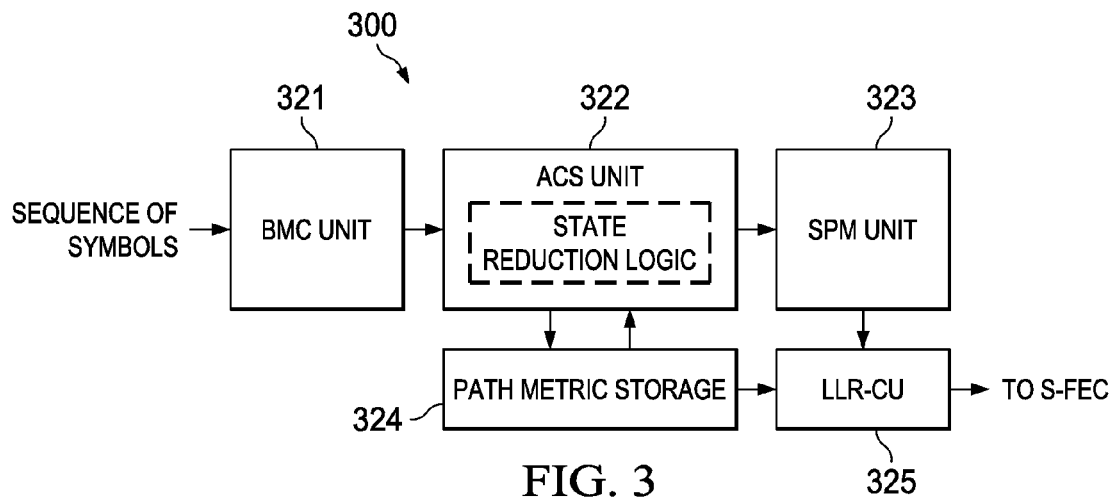
FIG. 3 is a block diagram of an embodiment trellis equalizer.

FIG. 3 is a block diagram of a trellis equalizer 300. As shown, the trellis equalizer 300 includes a branch metric computation (BMC) unit 321, an add compare select (ACS) unit 322, a survivor path management (SPM) unit 323, a path metric storage unit 324, and an LLR computation unit (LLR-CU) 325. The BMC unit 321 computes branch metrics (BMs) for candidate states of symbols in a sequence of symbols. The branch metric may be computed using a Euclidean distance measurement or any other augmented distance metric that takes into account the statistics of the channel impairment. For example, when the phase noise plays a dominant role, the metric may further include consideration for the channel phase and the memory therein. The ACS unit 322 computes APMs for each candidate symbol based on the BMs of that symbol, and (if available) APMs of earlier symbols. In some embodiments, the ACS unit 322 includes state reduction logic that selects subsets of candidate states of received symbols for which APMs are computed. The state reduction logic may select the subsets of candidate states based on ML state of the received symbols.

The branch metric from one stage of the trellis mapped to a leading symbol to another stage of the trellis mapped to a trailing symbol is computed for all possible state transitions from a state of the leading symbol to that of the trailing symbol. In some embodiments, the state of the leading symbol with the minimum branch metric (BM) is the ML state. In such embodiments, the APMs for all states of the trellis need not be computed which provides a further computational benefit to the state reduced equalization. In yet another embodiment, the APMs of all states are computed using the BMs of the leading symbol and the APMs of the trailing symbol. In such embodiments, the ML state for that stage of the trellis is the candidate state having the lowest APM value for that particular stage. In some embodiments, the state reduction logic utilizes a look up table that lists the highest probability neighbors of a given ML state.

After computation of the APMs, the ACS unit 322 stores the APMs in the path metric storage 324, and provides the APMs to the SPM unit 323. The SPM unit 323 uses the APMs to select the most likely path, which maps each symbol in the sequence of symbols to a most likely current state for that symbol. In some embodiments, the symbols are Quadrature Phase Shift Keying (QPSK) symbols. In other embodiments, the symbols are QAM symbols. In yet other embodiments, the signal carrying QAM or QPSK symbols is filtered prior to demodulation in such a manner that the symbols no longer exhibit characteristics of QPSK or QAM symbols. In such embodiments, filtering of the signal prior to modulation may prepare the signal for reduced state detection and/or increase the likelihood that the input signal to the trellis equalizer 300 is a minimum phase signal. In some other embodiments, the trellis states may denote channel phase.

The ACS unit 322 may obtain the APMs for candidate states of a current symbol by adding APMs of candidate states of a preceding symbol ($APM(s_{k-1})$) to branch metrics of the candidate states of the current symbol ($BM(s_k)$), where $s_k$ denotes a current stage of the trellis. The APMs may then be evaluated to identify a best path over the trellis. The candidate states corresponding to the best path are then added to a state history list of the current path, and stored in the SPM unit 323. The SPM 323 may store the state history list and the survivor path history for each of the trellis states, as well as branch metrics of the selected states. In some embodiments, the LLR-CU 325 computes soft-output information (e.g., LLRs), which is then used during bit-level decoding. In other embodiments, the trellis equalizer 300 generates a hard output, which may specify the states identified by the best path. In yet other embodiments, the best path may be used to provide further information regarding the channel impairment, such as for an estimation of the channel phase.

As mentioned above, conventional trellis equalization techniques compute APMs for each candidate state of the trellis, and then propagate the computed APMs to the subsequent stages of the trellis. APMs of previous stages must generally be stored in memory while APMs for subsequent stages are computed. As a result, conventional trellis equalization techniques may require substantial amounts of memory and processing resources when employed in systems communicating higher-order constellations (e.g., 16 QAM) and/or exhibiting relatively long channel memories.

Figure 4:
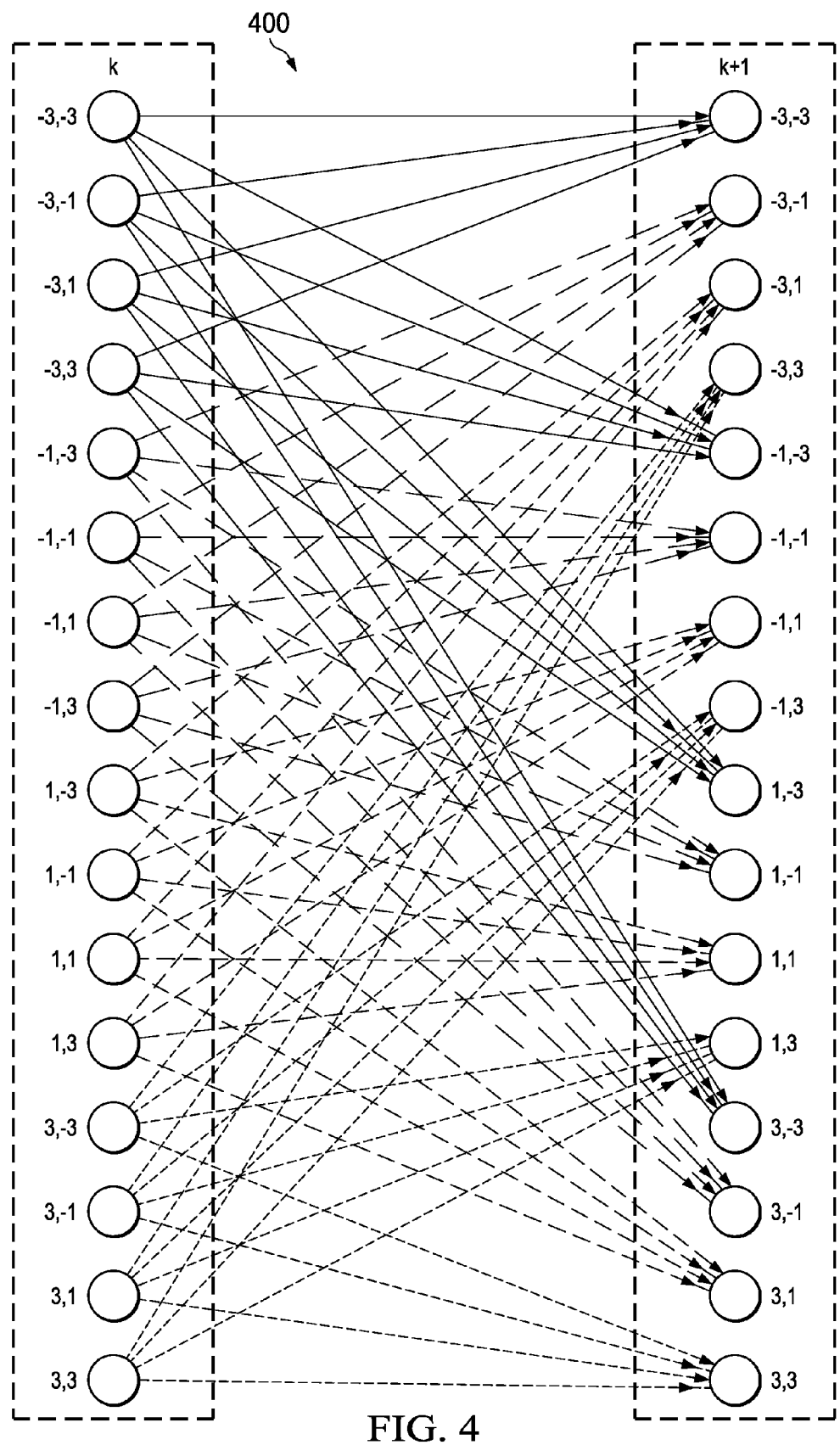
FIG. 4 is a diagram of a conventional trellis equalizer.

FIG. 4 depicts two consecutive stages of trellis for a conventional trellis equalizer 400 configured to evaluate 16-QAM symbols communicated over a system exhibiting a channel memory of two. The states of the trellis in this embodiment are defined as a tuple representing one dimension (either in-phase (I) or quadrature (Q)) of the transmitted symbol. At the current stage (k) of the trellis, the first integer in the tuple of each candidate state represents a component value of the current symbol (k), and the second integer in the tuple represents a component value of the leading symbol (k−1). Hence, at the candidate state of the current stage (k) associated with the tuple (−3,−1), the current symbol (k) has a component value of −3 and the leading symbol (k−1) has a component value of −1. At the next stage (k+1) of the trellis, the first integer in the tuple of each state represents a component value of the trailing symbol (k+1), and the second integer represents a component value of the current symbol (k). Hence, at the candidate state of the current stage associated with the tuple (1,−3), the trailing symbol (k−1) has a component value of 1, and the current symbol (k) has a component value of −3.

It should be appreciated that the trellis for a single dimension of the 16-QAM constellation with a channel memory of two is not fully connected, meaning that candidate states at the current stage (k) are only connected to candidate states at the next stage (k+1) that share the same component value for the current symbol (k). For example, the candidate state of the current stage (k) associated with the tuple (−3, −1) is connected only to candidate states of the next stage (k+1) that map a component value of the current symbol (k) to a value of −3; namely, candidate states of the next stage (k+1) that are associated with the tuples (−3,−3), (−1,−3), (1,−3), (3,−3).

As shown, the conventional trellis equalizer 400 computes APMs for each candidate state of the current stage (k), and then propagates all of the computed APMs from the current stage (k) to the next stage (k+1), which may require the conventional trellis equalizer 400 to consume significant amounts of processing and memory resources.

Embodiments disclosed herein reduce the processing and memory resources required for trellis equalization by computing APMs for fewer than all candidate states at one or more stages of a trellis. More specifically, a trellis equalizer may select a subset of candidate states for a given stage based on a neighborhood map of the corresponding ML state. The subset of candidate states identified by the neighboring map may be listed in a lookup table, which may be computed offline or generated dynamically, or semi-statically, during run-time operation of the trellis equalizer based on metrics of the channel. For computation during run-time operation, generation of the neighborhood map may further utilize the estimated tap weights of the channel with memory. The taps of a channel can be determined using either a stochastic gradient approach that minimizes a mean square error (MSE) value or through a multi-coefficient auto-regressive (AR) modeling approach. Such estimation may need to be done in periodic fashion with the interval between consecutive estimations of the channel tap being governed by the stability of the channel, with more frequent estimations being performed on fast fading channels than on slow fading channels. The estimated taps may be used to apply different weights to candidate states when identifying the highest likelihood neighbors of an ML state. In one example, the weights are applied to distances between the candidate states and the ML state to obtain weighted distances, and then a neighborhood map is generated based on the weighted distances such that the neighborhood map identifies the subset of candidate states as those candidate states having the shortest weighted distances.

Figure 5:
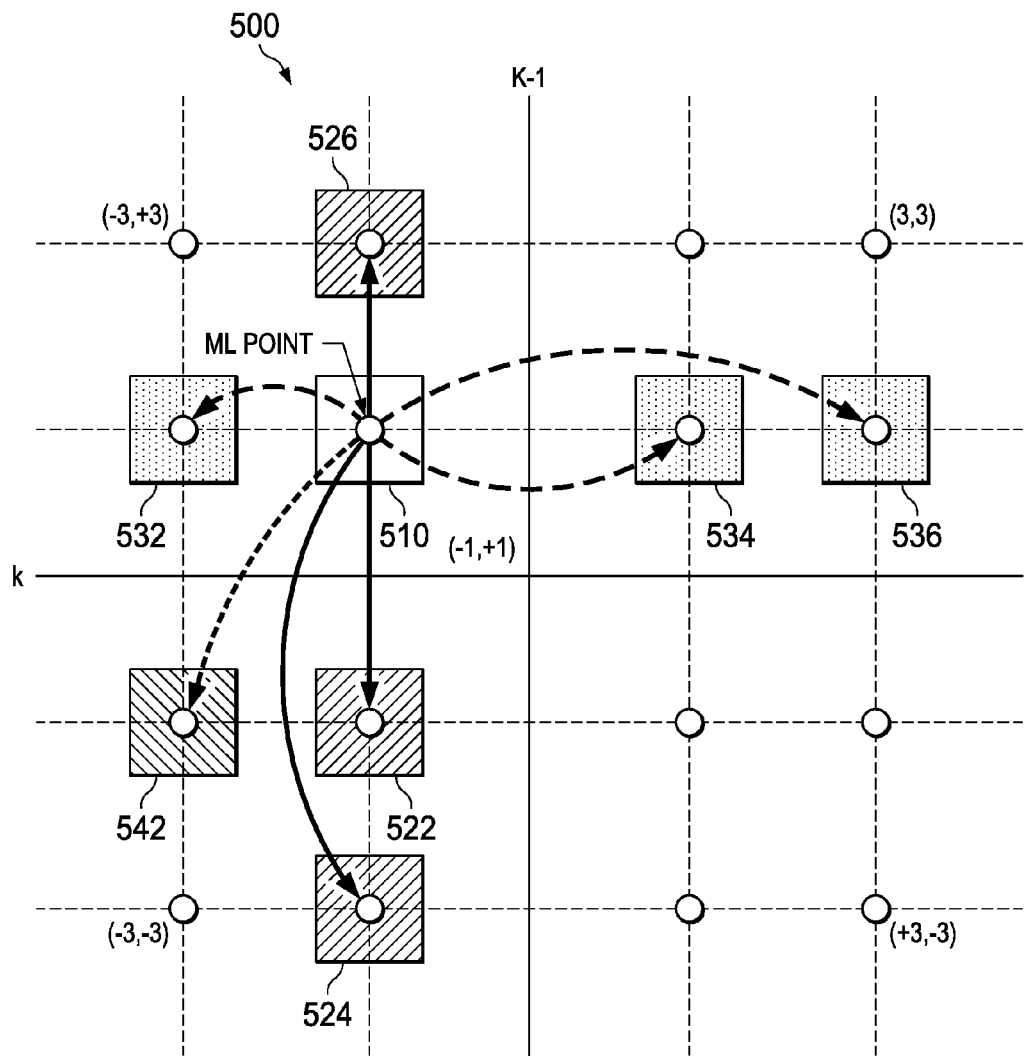
FIG. 5 is a diagram of an embodiment neighborhood map for component values of 16 QAM symbols communicated over a system exhibiting a channel memory of two.

FIG. 5 is an embodiment neighborhood map 500 for an ML state of components values of 16 QAM modulation symbols communicated over a system exhibiting a channel memory of two. In this example, the ML state corresponds to the selected candidate state 510, and the embodiment neighborhood map 500 identifies candidate states 522-542 as the highest probability neighbors of the selected candidate state 510.

The embodiment neighborhood map 500 is displayed on an effective channel memory hyper-plane, where the x-axis represents a component value of a current symbol (k) and the y-axis represents a component value of a leading symbol (k−1). The axes of the effective channel memory hyper-plane represent either in-phase components (I) of the respective symbols or quadrature components (Q) of the respective symbols. In this example, the 16 QAM modulation symbols are gray mapped such that the nearest neighboring candidate states on the x-axis map to component values of the current symbol (k) that differ in one bit in the binary domain, and the nearest neighboring candidate states on the y-axis map to component values of the leading symbol (k−1) that differ in one bit in the binary domain. For example, the candidate states associated with the tuples (−3,−3) and (−1, −3) correspond to component values of the current symbol (k) that map to binary values that are one bit different, as would be the case if −3 may map to the binary value of 00 and −1 may map to the binary value of 01. As another example, the candidate states associated with the tuples (−3,−3) and (−3, −1) correspond to component values of the leading symbol (k) that map to binary values that are one bit different.

The candidate states 522-542 are selected by flipping bits in the leading symbol and the current symbol. More specifically, the candidate states 522-526 are selected by maintaining the component value (−1) of the current symbol (k) of the selected candidate state 510, and flipping one bit of the component value (+1) of the leading symbol (k−1) of the selected candidate state 510. Likewise, the candidate states 532-536 are selected by maintaining the component value (+1) of the leading symbol (k−1) of the selected candidate state 510, and flipping one bit of the component value (−1) of the current symbol (k) of the selected candidate state 510.

The candidate state 542 is selected by flipping one bit of the component value (−1) of the current symbol (k) of the selected candidate state 510, and then flipping one bit of the component value (+1) of the leading symbol (k−1) of the selected candidate state 510.

Figure 6:
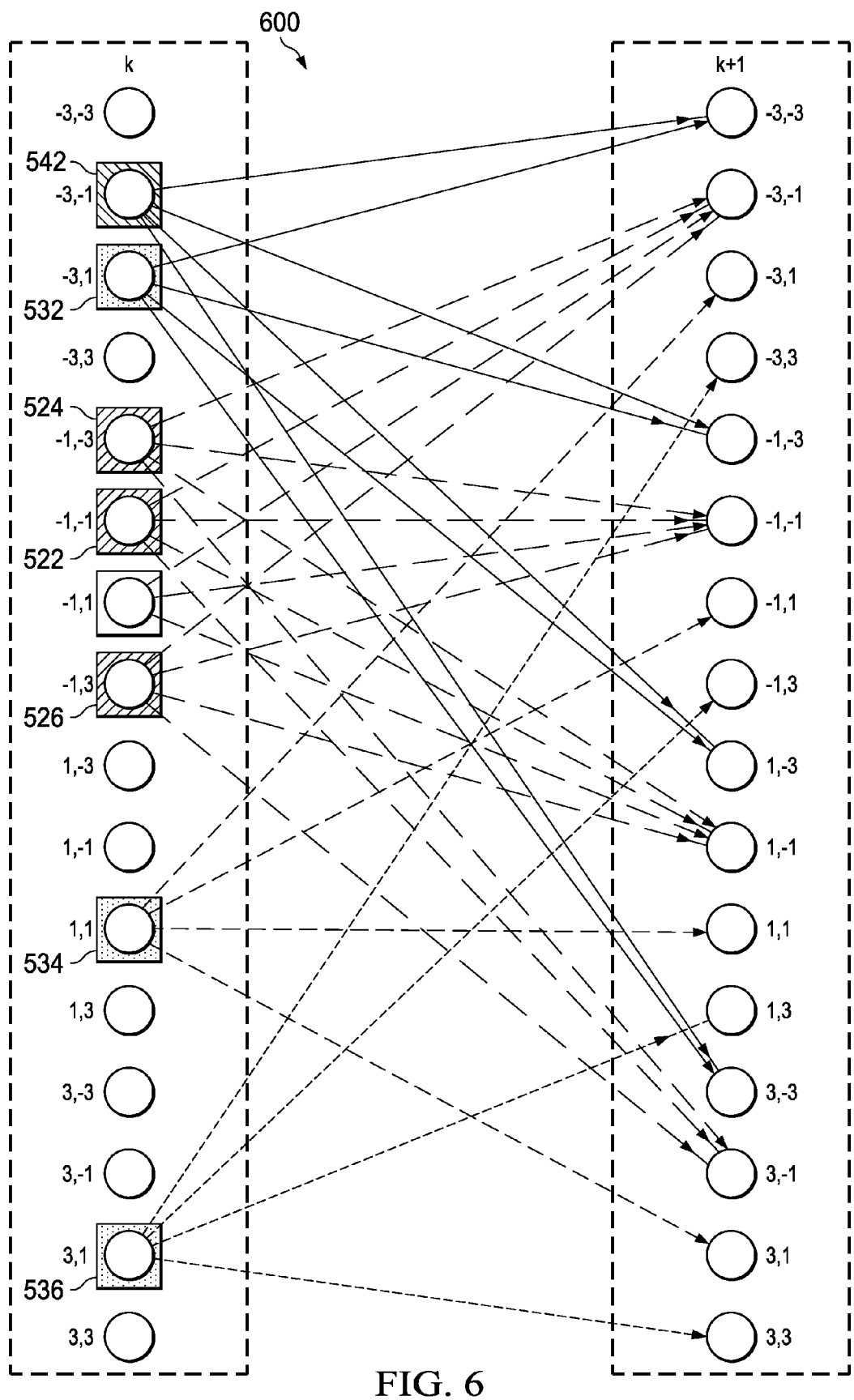
FIG. 6 is a diagram of an embodiment reduced state trellis corresponding to the neighborhood map depicted in FIG. 5.

FIG. 6 is an embodiment trellis equalizer 600 configured to evaluate symbols based on the subset of candidate states 510-542 identified by the neighborhood map 500. As shown, the embodiment trellis equalizer 600 computes APMs for the subset of candidate states 510-522 of the current stage (k), and then propagates the computed APMs to candidate states of the next stage (k+1). No APMs are computed for candidate states of the current stage (k) that are excluded from the subset of candidate states 510-542, thereby reducing the processing and memory resources consumed by the embodiment trellis equalizer 600.

Figure 7A:
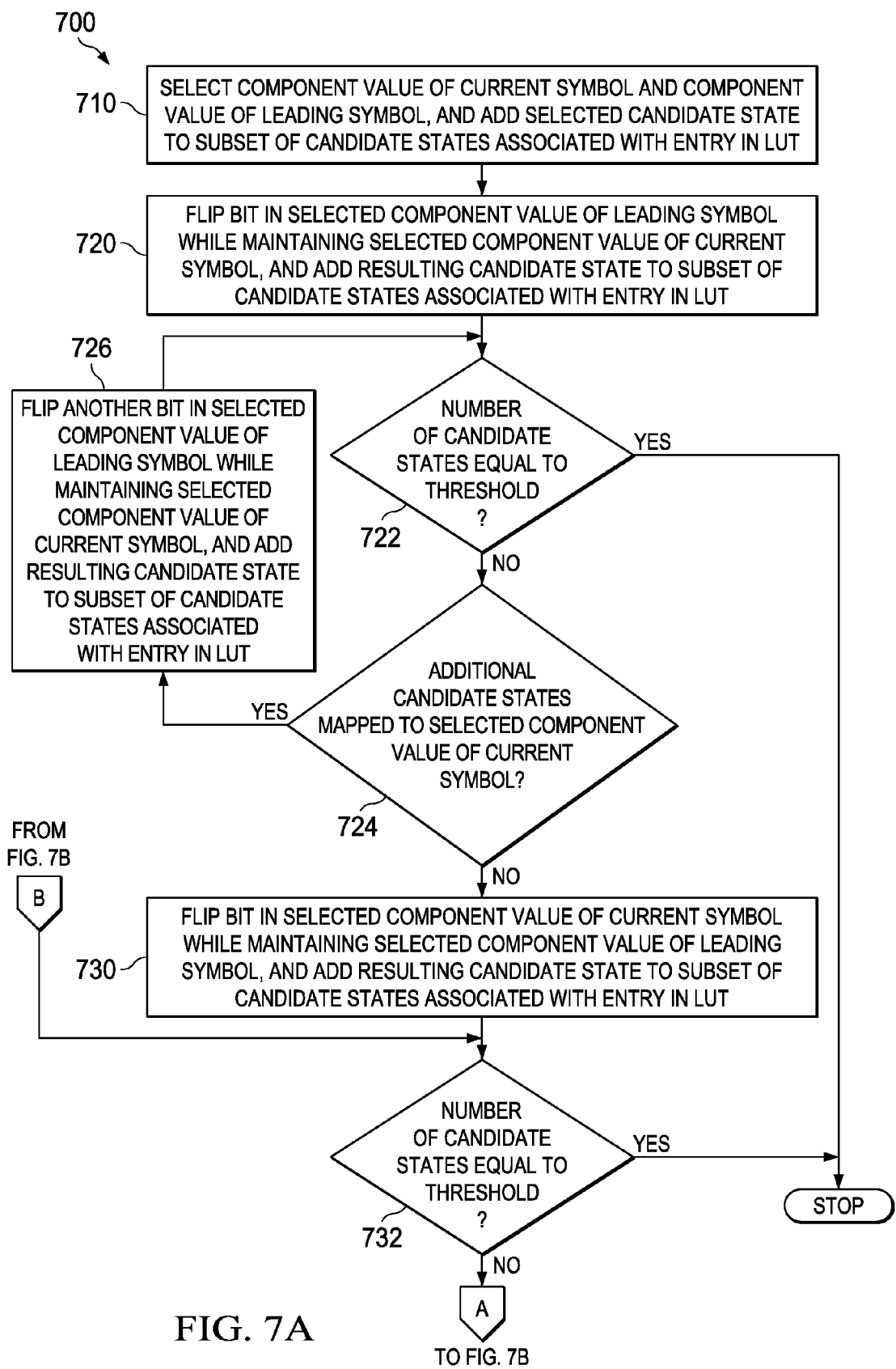
FIGS. 7A-7B depict a flowchart of an embodiment method for constructing an entry for an ML state in a lookup table.
Figure 7B:
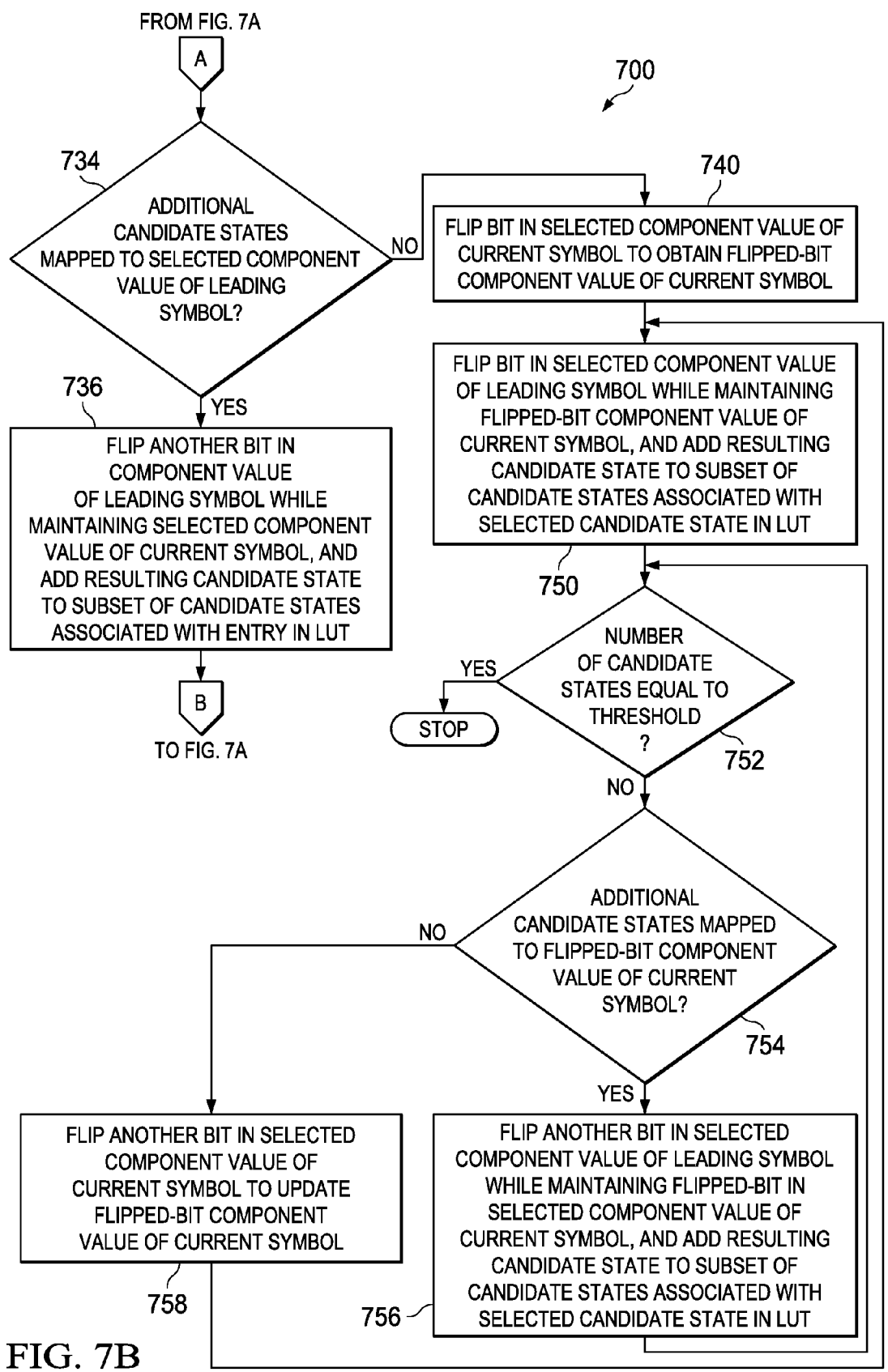

FIGS. 7A-7B is a flowchart of an embodiment method 700 for building an entry for an ML state in a lookup table, as might be performed by a controller when considering a channel memory of 2. At step 710, the controller selects a component value of a current symbol and a component value of a leading symbol, and adds the resulting candidate state to a subset of selected candidate states associated with the entry in the LUT. The selected candidate state corresponds to the ML state.

At step 720, the controller flips a bit in the selected component value of the leading symbol while maintaining the selected component value of the current symbol, and adds the resulting candidate state to the subset of candidate states associated with the entry in the LUT.

At step 722, the controller determines whether the number of candidate states associated with the entry in the LUT is equal to a threshold. The threshold is the number of candidate states for which APMs are to be computed at a given stage of the trellis. For example, in the neighborhood map 500, the threshold is eight candidate states. If the number of candidate states is equal to the threshold, then the method 700 ends. If the number of candidate states is less than the threshold, then the controller determines whether there are additional candidate states mapped to selected component value of current symbol at step 724. If so, the method 700 proceeds to step 726, where the controller flips another bit in the selected component value of the leading symbol while maintaining the selected component value of current symbol, and adds the resulting candidate state to the subset of candidate states associated with the entry in the LUT. After step 726, the method 700 reverts back to step 722.

If the controller determines that there are no additional candidate states mapped to the selected component value of current symbol at step 724, then the method 700 proceeds to step 730. At step 730, the controller flips a bit in the selected component value of the current symbol while maintaining the selected component value of the leading symbol, and adds the resulting candidate state to the subset of candidate states associated with the entry in the LUT.

At step 732, the controller determines whether the number of candidate states in the subset of candidate states associated with the entry in the LUT is equal to the threshold. If so, then the method 700 ends. Otherwise, the controller determines whether there are additional candidate states mapped to the selected component value of leading symbol at step 734. If so, the method 700 proceeds to step 736, where the controller flips another bit in the selected component value of the current symbol while maintaining the selected component value of leading symbol, and adds the resulting candidate state to the subset of candidate states associated with the entry in the LUT. After step 736, the method 700 reverts back to step 732.

If the controller determines that there are no additional candidate states mapped to the selected component value of the leading symbol at step 734, then the method 700 proceeds to step 740. As step 740, the controller flips a bit in the selected component value of the current symbol to obtain a flipped-bit component value of the current symbol. At step 750, the controller flips a bit in the selected component value of the leading symbol while maintaining the flipped-bit component value of the current symbol, and adds the resulting candidate state to the subset of candidate states associated with the entry in the LUT.

At step 752, the controller determines whether the number of candidate states in the subset of candidate states is equal to the threshold. If so, the method 700 ends. Otherwise, the controller determines whether there are additional candidate states mapped to the flipped-bit component value of the current symbol at step 754. If so, the method 700 proceeds to step 756, where the controller flips another bit in the selected component value of the leading symbol while maintaining the flipped-bit of the current symbol, and adds the resulting candidate state to the subset of candidate states associated with the entry in the LUT. Thereafter, the method 700 repeats steps 752-758 until the number of candidate states in the subset of candidate state associated with the selected candidate state is equal to the threshold.

Table 1 illustrates how the method 700 could be used to construct an entry in a LUT that corresponds to the neighborhood map 500.

TABLE 1

| Step | Action |
| --- | --- |
| 710 | Add Candidate State 510 to Subset of Candidate States in LUT |
| 720 | Add Candidate State 522 to Subset of Candidate States in LUT |
| 722 | No (two < eight), proceed to 724 |
| 724 | Yes, proceed to 726 |
| 726 | Add Candidate State 524 to Subset of Candidate States in LUT |
| 722 | No (three < eight), proceed to 724 |
| 724 | Yes, proceed to 726 |
| 726 | Add Candidate State 526 to Subset of Candidate States in LUT |
| 722 | No (four < eight), proceed to 724 |
| 724 | No, proceed to 730 |
| 730 | Add Candidate State 532 to Subset of Candidate States in LUT |
| 732 | No (five < eight), proceed to 734 |
| 734 | Yes, proceed to 736 |
| 736 | Add Candidate State 534 to Subset of Candidate States in LUT |
| 732 | No (six < eight), proceed to 734 |
| 734 | Yes, proceed to 736 |
| 736 | Add Candidate State 536 to Subset of Candidate States in LUT |
| 732 | No (seven < eight), proceed to 734 |
| 734 | No, proceed to 740-750 |
| 750 | Add Candidate State 742 to Subset of Candidate States in LUT |
| 752 | Yes (eight = eight), method ends |

The above-discussed technique constructs an entry in a look up table by first selecting candidate states mapped to the selected component value of the current symbol, and then selecting candidate states mapped to the selected component value of the leading symbol. If needed, additional candidate states are selected based on which candidate states are mapped to bit-flipped component values of the current symbol. Those of ordinary skill in the art will appreciate, after reviewing this disclosure, that variations of that technique may be used to construct entries of a look up table.

Figure 9:
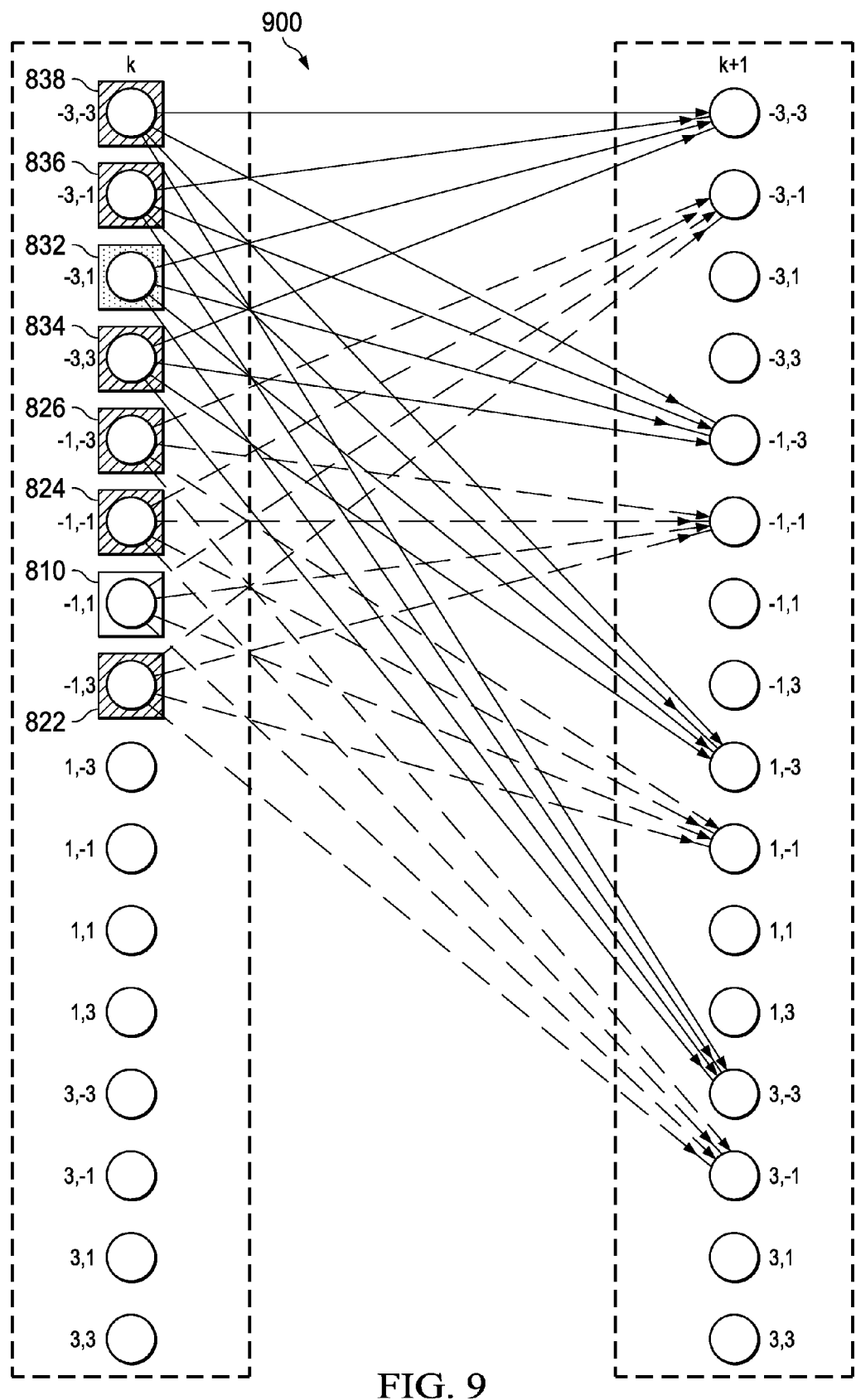
FIG. 9 is a diagram of an embodiment reduced state trellis corresponding to the neighborhood map depicted in FIG. 8.
Figure 10A:
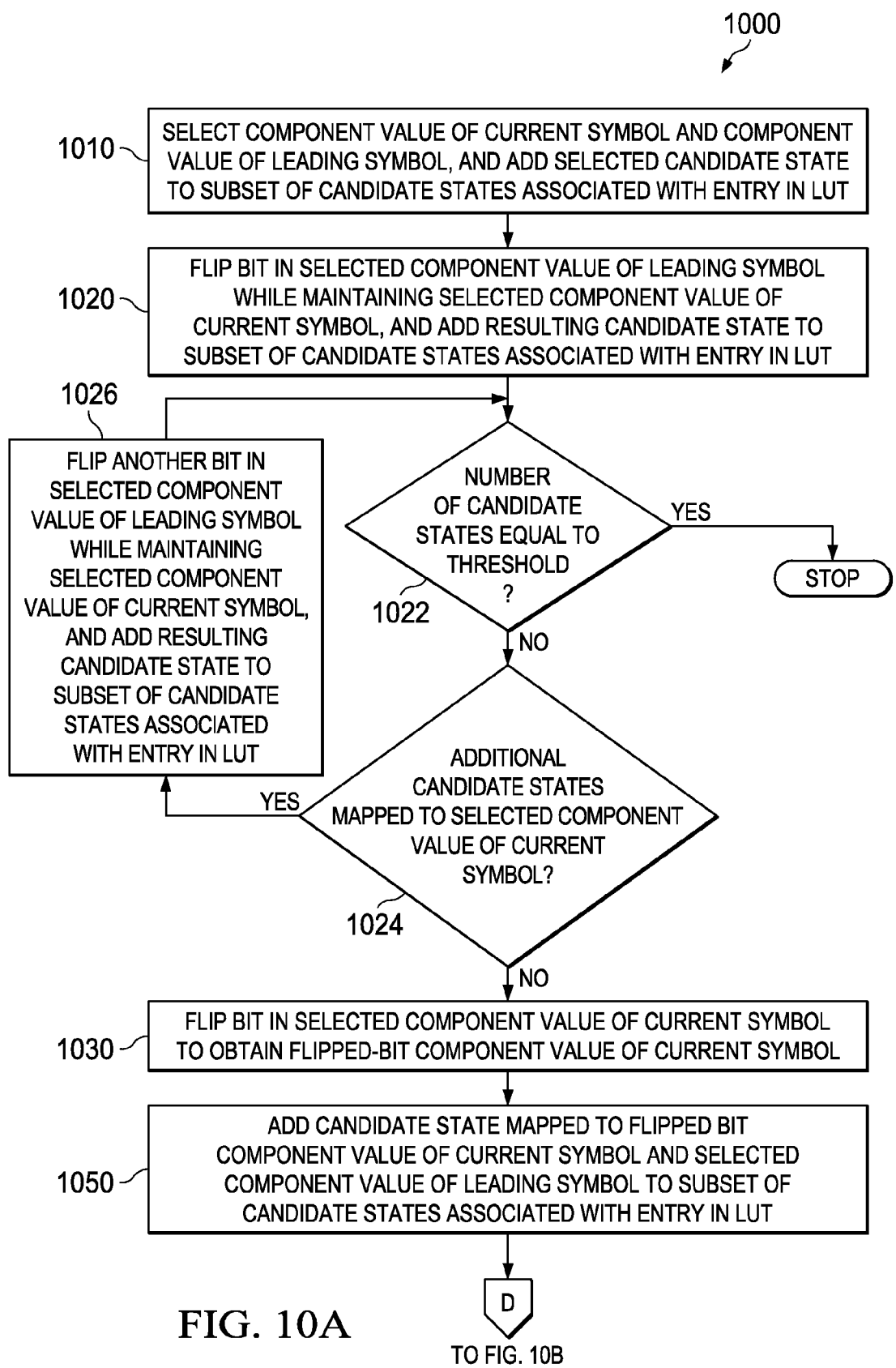
FIGS. 10A-10B depict a flowchart of another embodiment method for constructing an entry for an ML state in a lookup table.
Figure 10B:
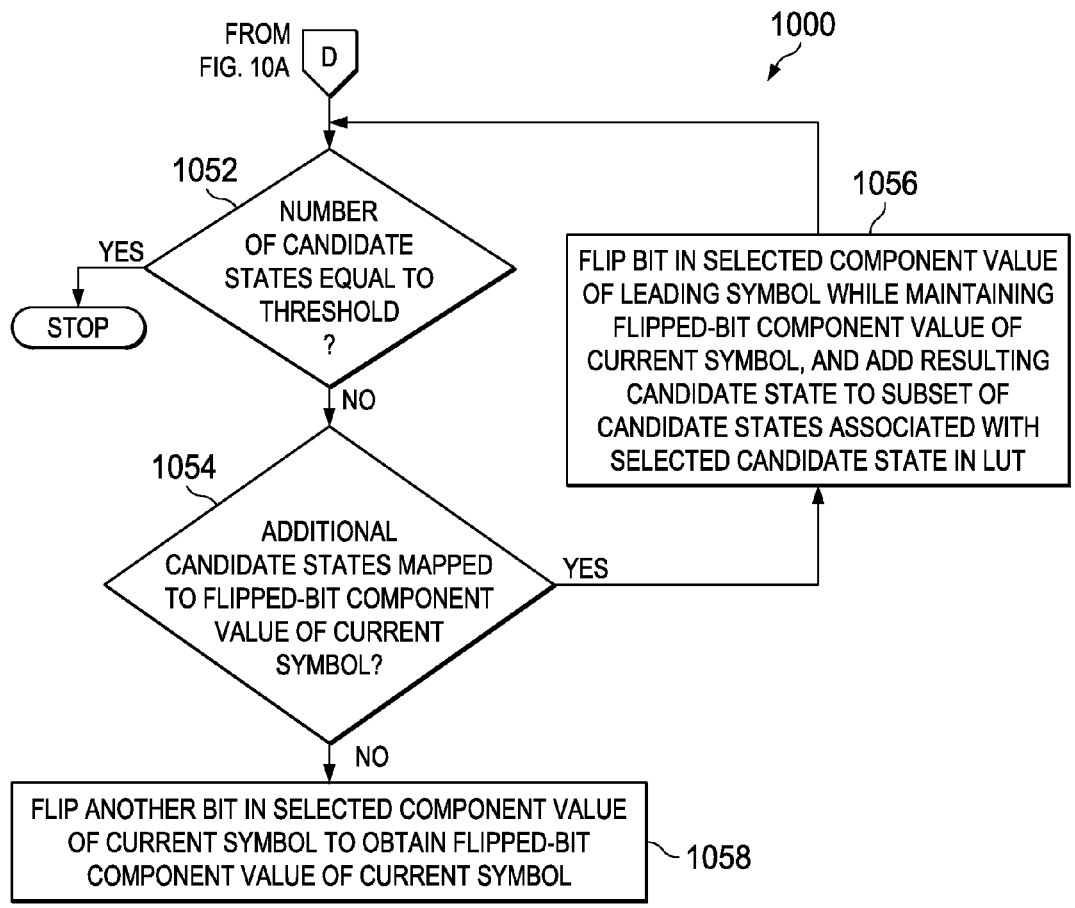

For example, an entry in a look up table may be constructed by first selecting candidate states mapped to the selected component value of the current symbol, and then selecting candidate states mapped to bit-flipping component values of the current symbol. Such a technique is illustrated in FIGS. 8-10.

Figure 8:
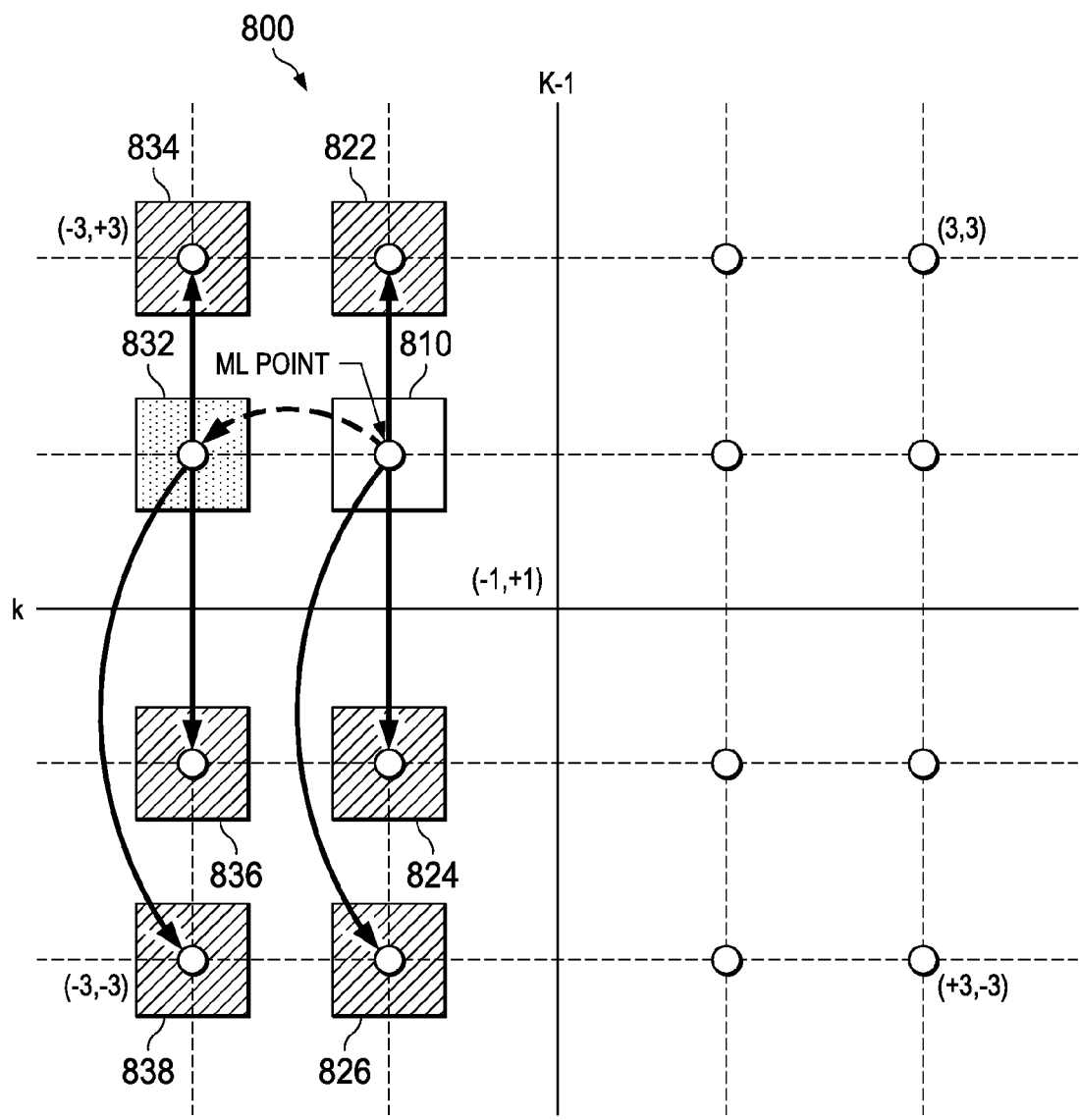
FIG. 8 is a diagram of another embodiment neighborhood map for in-phase or quadrature components of 16 QAM symbols communicated over a system exhibiting a channel memory of two.

FIG. 8 is an embodiment neighborhood map 800 for an ML state of in-phase or quadrature components of a pair of 16 QAM modulation symbols communicated over a system exhibiting a channel memory of two. In this example, the ML state corresponds to the selected candidate state 810, and the embodiment neighborhood map 500 identifies candidate states 822-838 as the highest probability of the selected candidate state 810.

The candidate states 822-826 and 832 are selected in a manner similar to the candidate states 522-526 and 532 in the neighborhood map 500. However, in this example, the candidate states 832-836 are selected by bit flipping the component value (−1) of the current symbol (k) of the selected candidate state 810 to obtain a bit-flipped value (−3) of the current symbol, and then flipping one bit of the component value of the leading symbol (k−1) of the selected candidate state 810 while maintaining the bit-flipped value (−3) of the current symbol.

The neighboring maps 500, 800 identify eight candidate states for 16 QAM constellations communicated over systems exhibiting a channel memory of two. However, it should be appreciated that the bit-flipping techniques described herein can be used to construct neighboring maps for different constellations (e.g., 64 QAM), and may identify any number of candidate states for symbols communicated over systems exhibiting different amounts of channel memory.

FIG. 9 is an embodiment trellis equalizer 900 configured to evaluate 16-QAM symbols in a system exhibiting a channel memory of two based on the subset of candidate states 810-838 identified by the neighborhood map 800.

FIG. 10 is a flowchart of an embodiment method 1000 for building an entry for an ML state in a lookup table, as might be performed by a controller. Steps 1010-1020 mirror steps 710-726 from the method 700 depicted in FIGS. 7A-7B, and the descriptions of those steps are not repeated.

At step 1030, the controller flips a bit in the selected component value of the current symbol to obtain a flipped-bit component value of the current symbol. At step 1050, the controller adds a candidate state mapped to the flipped bit component value of current symbol and the selected component value of the leading symbol to the subset of candidate states associated with entry in LUT. At step 1052, the controller determines whether the number of candidate states in the subset of candidate states is equal to the threshold. If so, the method 1000 ends. Otherwise, the controller determines whether there are additional candidate states mapped to the flipped-bit component value of the current symbol at step 1054. If so, the method 1000 proceeds to step 1056, where the controller flips another bit in the selected component value of the leading symbol while maintaining the flipped-bit component value of the current symbol, and adds the resulting candidate state to the subset of candidate states associated with the entry in the LUT. If no additional candidate states are mapped to the flipped-bit component value of the current symbol, then the method 1000 proceeds to step 1058, where the controller flips another bit in selected component value of current symbol to update the flipped-bit component value of current symbol. Thereafter, the method 1000 repeats steps 1052-1058 until the number of candidate states in the subset of candidate state associated with the selected candidate state is equal to the threshold.

Table 2 illustrates how the method 1000 could be used to construct an entry in a LUT that corresponds to the neighborhood map 800.

| Step | Action |
|------|--------|
| 1010 | Add Candidate State 810 to Subset of Candidate States in LUT |
| 1020 | Add Candidate State 822 to Subset of Candidate States in LUT |
| 1022 | No (two < eight), proceed to 1024 |
| 1024 | Yes, proceed to 1026 |
| 1026 | Add Candidate State 824 to Subset of Candidate States in LUT |
| 1022 | No (three < eight), proceed to 1024 |
| 1024 | Yes, proceed to 1026 |
| 1026 | Add Candidate State 826 to Subset of Candidate States in LUT |
| 1022 | No (four < eight), proceed to 1024 |
| 1024 | No, proceed to 1030-1050 |
| 1050 | Add Candidate State 832 to Subset of Candidate States in LUT |
| 1052 | No (five < eight), proceed to 1054 |
| 1054 | Yes, proceed to 1056 |
| 1056 | Add Candidate State 834 to Subset of Candidate States in LUT |
| 1052 | No (six < eight), proceed to 1054 |
| 1054 | Yes, proceed to 1056 |
| 1056 | Add Candidate State 836 to Subset of Candidate States in LUT |
| 1052 | No (seven < eight), proceed to 1054 |
| 1054 | Yes, proceed to 1056 |
| 1056 | Add Candidate State 838 to Subset of Candidate States in LUT |
| 1052 | Yes (eight = eight), method ends |

Although the methods 700 and 1000 are described in the context of a system exhibiting a channel memory of two, those of ordinary skill in the art would understand how to modify those methods so that they would be suitable for any channel memory.

Figure 11:
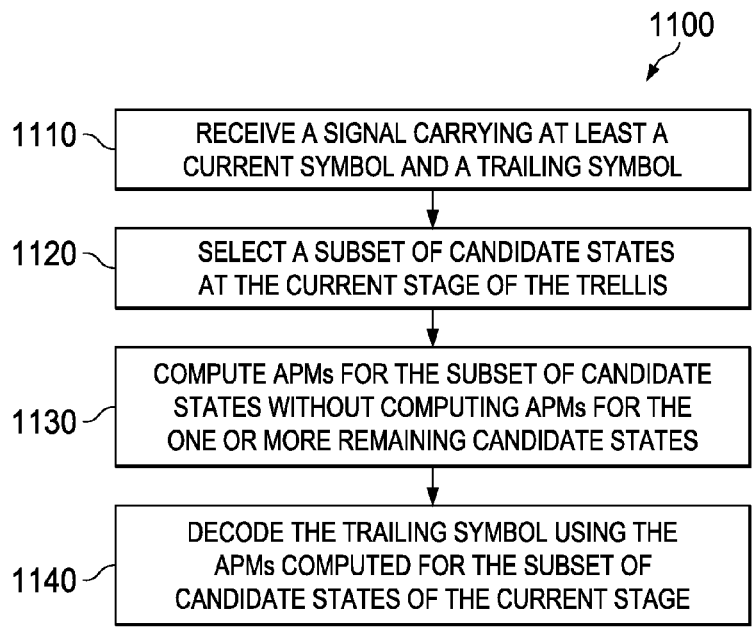
FIG. 11 is a flowchart of an embodiment method for performing reduced-state trellis equalization.

Aspects of this disclosure further provide embodiment methods for performing reduced state trellis equalization. FIG. 11 is a flowchart of an embodiment method 1100 for performing reduced state trellis equalization, as may be performed by a receiver. At step 1110, the receiver receives a signal carrying at least a current symbol and a trailing symbol. The current symbol may be mapped to a current stage of a trellis, and the trailing symbol mapped to a next stage of a trellis. At step 1120, the receiver selects a subset of candidate states at the current stage of the trellis. The subset of candidate states may be selected by identifying an ML state from measurements of the signal, and then identifying the subset of candidate states from a lookup table based on the ML state. At step 1130, the receiver entry computes APMs for the subset of candidate states without computing APMs for one or more remaining candidate states of the current stage. The one or more remaining candidate states are excluded from the subset of candidate states. At step 1140, the receiver decodes the trailing symbol using the APMs computed for the subset of candidate states of the current stage. This may include using the APMs computed for the subset of candidate states of the current stage to compute APMs at the next stage, and then using all of the computed APMs to select a best path over the trellis.

Figure 12:
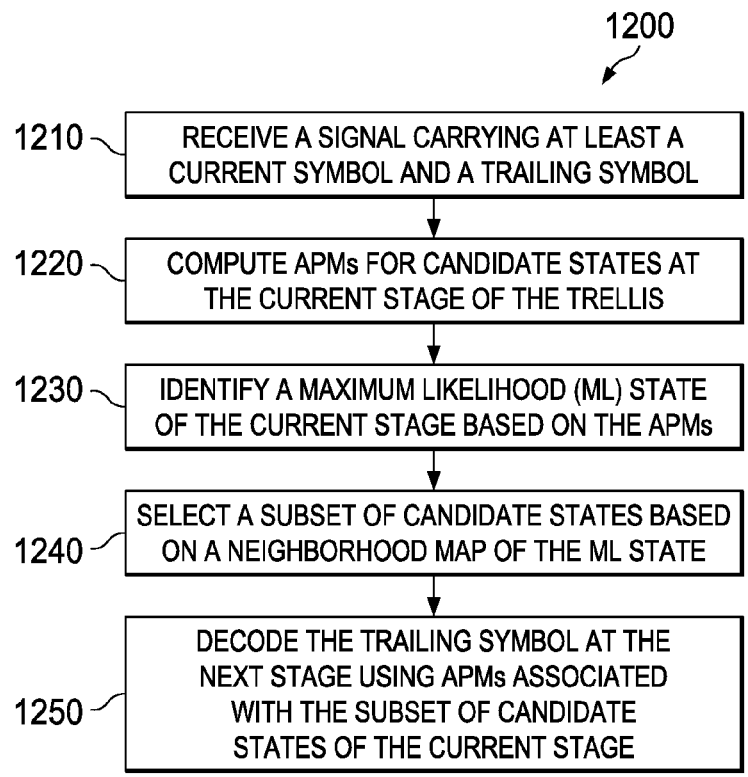
FIG. 12 is a flowchart of another embodiment method for performing reduced state trellis equalization.

In some embodiments, a subset of candidates states are selected based on a neighborhood map of an ML state without sorting APMs of neighboring candidate states of the ML state following identification of the ML state. This reduces the processing and latency involved with sorting APMs of candidate states of the ML state. FIG. 12 is a flowchart of an embodiment method 1200 for performing reduced state trellis equalization, as may be performed by a receiver. At step 1210, the receiver receives a signal carrying at least a current symbol and a trailing symbol. The current symbol may be mapped to a current stage of a trellis, and the trailing symbol mapped to a next stage of a trellis. At step 1220, the receiver computes APMs for candidate states at the current stage of the trellis. At step 1230, the receiver identifies a maximum likelihood (ML) state of the current stage based on the computed APMs. The ML state may be the candidate state having the lowest APM, and may be identified by performing a single round of sorting operations on the computed APMs to find the lowest APM. Notably, APMs of neighboring candidate states of the ML state remain unsorted with respect to one another following the single round of sorting operations performed to identify the ML state, as the single round of sorting operations may identify the lowest APM without determining an order list of the remaining APMs. Conventional reduced state trellis equalization techniques would typically perform additional rounds of sorting to arrange the APMs in a descending order, and then select the subset based on the descending order of APMs. However, performing additional rounds of sorting may be computationally expensive, as well as introduce latency into the decoding operation. Rather than performing additional rounds of sorting, the receiver selects a subset of candidate states based on a neighborhood map of the ML state at step 1240. Selecting the subset of candidate states may occur without sorting APMs of neighboring candidate states of the ML state following identification of the ML state. At step 1250, the receiver decodes the trailing symbol using the APMs corresponding to the subset of candidate states of the current stage. This may include using the APMs computed for the subset of candidate states of the current stage to compute APMs at the next stage, and then using all of the computed APMs to select a best path over the trellis.

Figure 13:
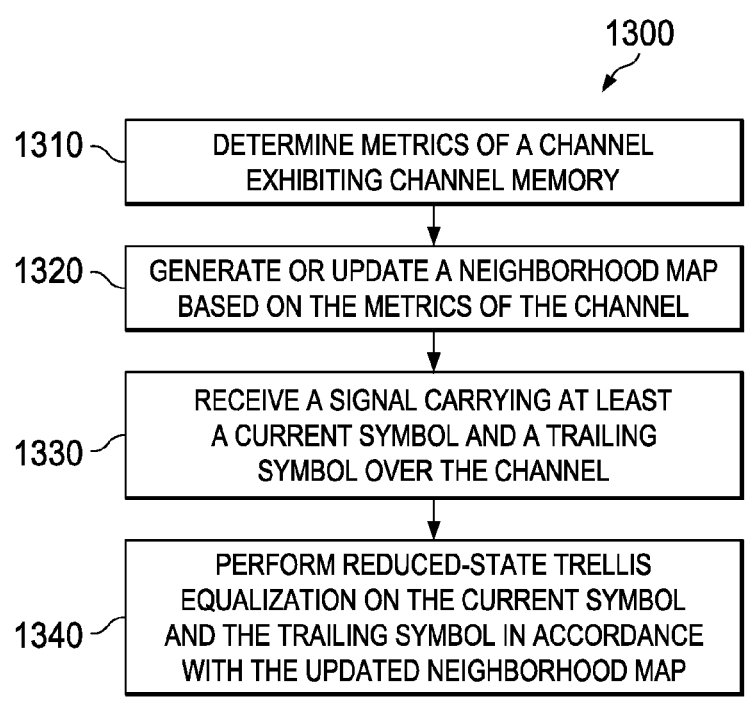
FIG. 13 is a flowchart of yet another embodiment method for performing reduced state trellis equalization.

In some embodiments, neighborhood maps are generated and/or updated dynamically using metrics of a channel. FIG. 13 is a flowchart of an embodiment method 1300 for performing reduced state trellis equalization using a dynamically or semi-statically generated/updated neighborhood map, as may be performed by a receiver. At step 1310, the receiver determines metrics of a channel exhibiting channel memory. The metrics may include parameters pertaining to channel impairment, such as additive noise and/or phase noise. At step 1320, the receiver generates or updates a neighborhood map based on the metrics of the channel. This may allow the neighborhood map to accommodate for the channel impairment. At step 1330, the receiver receives a signal carrying at least a current symbol and a trailing symbol. The current symbol may be mapped to a current stage of a trellis, and the trailing symbol mapped to a next stage of a trellis. At step 1340, the receiver performs reduced-state trellis equalization on the current symbol and the trailing symbol in accordance with the neighborhood map. This may include updating a look-up table to list a subset of candidate states based on the neighborhood map, and then using the look-up table to perform reduced state trellis equalization.

Figure 14:
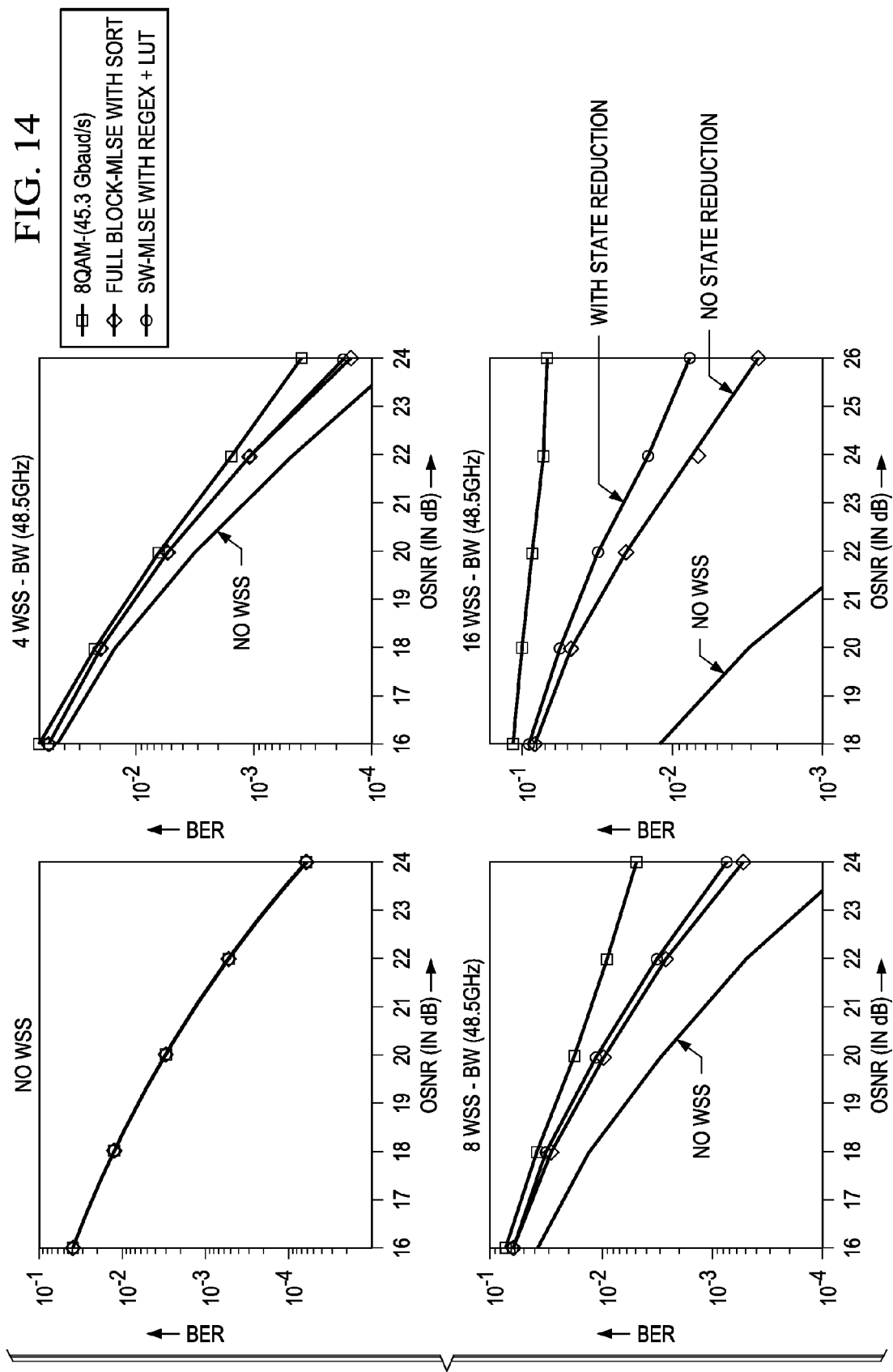
FIG. 14 is a set of graphs demonstrating Bit Error Rate (BER) performance of embodiment reduced state trellis equalizers under different channel conditions.

FIG. 14 is a set of graphs demonstrating the BER performance achieved by embodiment reduced state trellis equalization techniques under different channel conditions for a coherent optical path. Residual ISI tends to be greater when more wavelength selective switches (WSSs) are present in the optical path. Thus, the residual ISI is higher when 16 WSSs are present than when 8 WSSs are present. Likewise, the residual ISI is higher when there are 8 WSSs in the optical path than when only 4 WSSs are present, and the residual ISI is higher when there are 4 WSSs than when there are no WSSs in the optical path. As shown, embodiment reduced state trellis detectors show almost identical performance to full-state trellis detectors when 4 or 8 WSSs are present.

Embodiment reduced state equalization techniques use a deterministic approach to select a subset of candidate states for which APMs are computed, which avoids the complexity of sorting APMs in hardware. The subset of candidate states can be selected using a LUT, which is constructed from neighborhood maps of possible ML states in an effective channel memory hyper-plane. The dimensions of the LUT for a trellis that has N states is [N×M_RS], where M_RS is the number of states considered in the reduced state trellis. The reduced-state trellis equalization techniques may achieve reduced latency when compared to conventional reduced-state trellis equalization techniques, because conventional reduced-state trellis equalization techniques perform sorting to determine which APMs are propagated over the trellis may take several clock cycles per trellis stage. The embodiment reduced state trellis equalizers described herein provide faster enumeration, with less hardware complexity, than conventional reduced state trellis equalizers, by virtue of not having to sort the APMs at each stage of the trellis. The embodiment reduced state trellis equalizers also achieve lower processing latency than equalizers that achieve state reduction through decision feedback (DF). While much of this disclosure discusses reduced state trellis equalization in the context of different symbols being mapped to different stages of a trellis, it should be appreciated that the inventive concepts described herein can also be applied to receivers that map different samples of symbols to different stages of a trellis. For example, in a receiver that generates two samples for every symbols, 200 samples would be generated for every 100 symbols. This may be helpful in when performing timing recovery and chromatic dispersion (CD) compensation.

Figure 15:
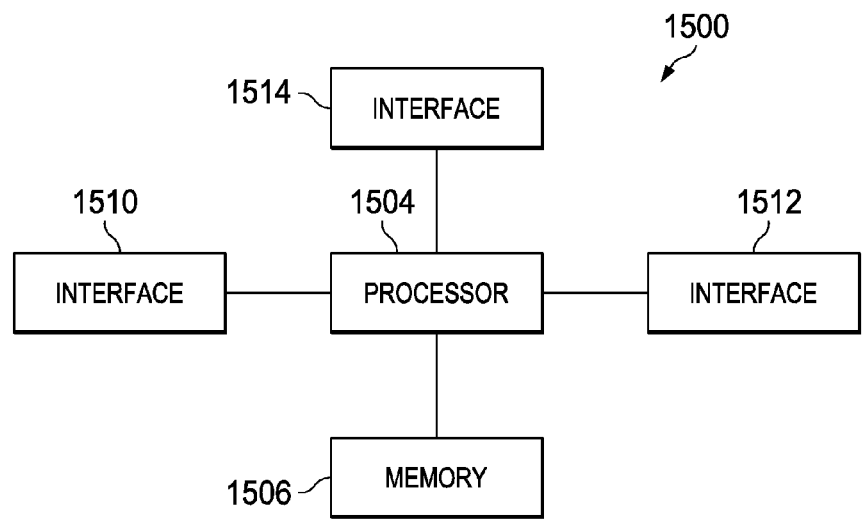
FIG. 15 is a block diagram of an embodiment processing system.

FIG. 15 is a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC)) to interact/communicate with the processing system 1500. The processing system 1500 may include additional components not depicted in FIG. 15, such as long term storage (e.g., non-volatile memory).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch), or any other device adapted to access a telecommunications network.

Figure 16:
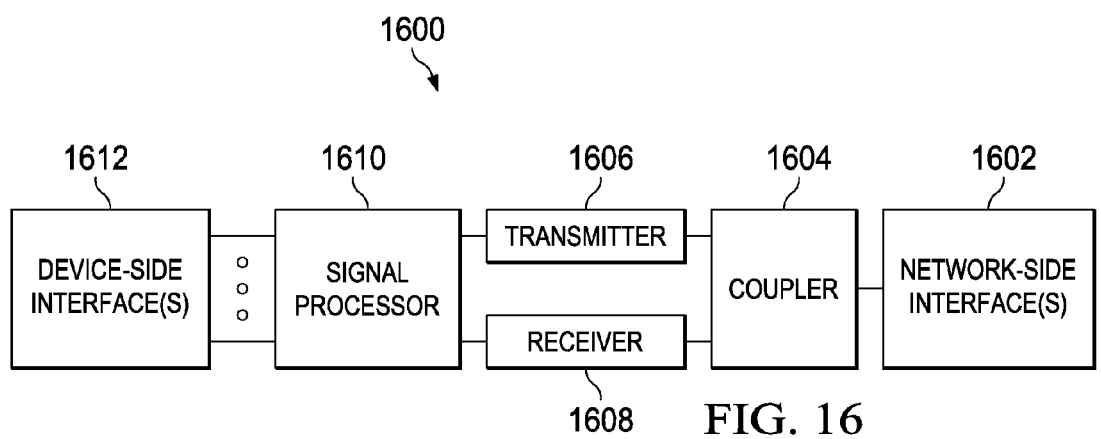
FIG. 16 is a block diagram of an embodiment transceiver.

In some embodiments, one or more of the interfaces 1510, 1512, 1514 connects the processing system 1500 to a transceiver adapted to transmit and receive signaling over the telecommunications network. FIG. 16 is a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier) adapted to convert a baseband signal into a modulated carrier signal suitable for transmission over the network-side interface 1602. The receiver 1608 may include any component or collection of components (e.g., down-converter, low noise amplifier) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE)), a wireless local area network (WLAN) protocol (e.g., Wi-Fi), or any other type of wireless protocol (e.g., Bluetooth, near field communication (NFC)). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO) In other embodiments, the transceiver 1600 transmits and receives signaling over a wireline medium, e.g., twisted-pair cable, coaxial cable, optical fiber. Specific processing systems and/or transceivers may utilize all of the components shown, or only a subset of the components, and levels of integration may vary from device to device.

What is claimed is:

1. A method for reduced state trellis equalization, the method comprising:
    receiving, over an interface of a device, a signal carrying at least a current symbol and a trailing symbol over a system exhibiting channel memory, the current symbol being received before the trailing symbol, the current symbol being mapped to a current stage of a trellis and the trailing symbol being mapped to a next stage of the trellis;
    selecting, by a controller in the device, a subset of candidate states at the current stage of the trellis, the current stage of the trellis including the subset of candidate states and one or more remaining candidate states that are excluded from the subset of candidate states;
    computing, by an equalizer in the device, a first set of accumulated path metrics (APMs) for the subset of candidate states at the current stage of the trellis without computing APMs for the one or more remaining candidate states at the current stage of the trellis such that APMs are computed for fewer than all states at the current stage of the trellis; and
    decoding, by the equalizer, the trailing symbol using at least the APMs for the subset of candidate states of the current stage of the trellis.

2. The method of claim 1, wherein decoding the trailing symbol at the next stage of the trellis using at least the APMs computed for the subset of candidate states of the current stage of the trellis comprises:
    propagating the APMs for the subset of candidate states of the current stage of the trellis from the current stage of the trellis to the next stage of the trellis;
    computing APMs for at least some candidate states at the next stage of the trellis using the APMs propagated from the current stage of the trellis; and
    selecting a best path over the trellis based on the APMs computed at the next stage of the trellis.

3. A method for reduced state trellis equalization, the method comprising:
    receiving, over an interface of a device, a signal carrying at least a current symbol and a trailing symbol over a system exhibiting channel memory, the current symbol being received before the trailing symbol, the current symbol being mapped to a current stage of a trellis and the trailing symbol being mapped to a next stage of the trellis;
    selecting, by a controller in the device, a subset of candidate states at the current stage of the trellis, the current stage of the trellis including the subset of candidate states and one or more remaining candidate states that are excluded from the subset of candidate states, wherein selecting the subset of candidate states for the current stage of the trellis comprises identifying a maximum likelihood (ML) state for the current stage of the trellis based on measurements of the signal and selecting the subset of candidate states for the current stage of the trellis from a look up table based on the ML state;
    computing, by an equalizer in the device, a first set of accumulated path metrics (APMs) for the subset of candidate states at the current stage of the trellis without computing APMs for the one or more remaining candidate states at the current stage of the trellis; and
    decoding, by the equalizer, the trailing symbol using at least the APMs for the subset of candidate states of the current stage of the trellis.

4. The method of claim 3, wherein the look up table identifies highest probability neighbors of the ML state.

5. The method of claim 3, wherein the ML state is mapped to an effective channel memory hyper-plane, and wherein a neighborhood map of the ML state on the effective channel memory hyper-plane identifies the subset of candidates states as highest probability neighbors of the ML state.

6. The method of claim 5, wherein a first dimension of the effective channel memory hyper-plane corresponds to an in-phase component value of the current symbol, and a second dimension of the effective channel memory hyper-plane corresponds to an in-phase component value of a leading symbol that precedes the current symbol.

7. The method of claim 6, wherein the subset of candidate states correspond to combinations of the in-phase component value of the current symbol and the leading symbol that are most likely to produce the ML state.

8. The method of claim 6, wherein a first dimension of the effective channel memory hyper-plane corresponds to a quadrature component value of the current symbol, and a second dimension of the effective channel memory hyper-plane corresponds to a quadrature component value of a leading symbol that precedes the current symbol.

9. The method of claim 8, wherein the subset of candidate states correspond to combinations of the quadrature component values of the current symbol and the leading symbol that are most likely to produce the ML state.

10. A device for reduced state trellis equalization, the device comprising:
a receiver configured to receive a signal carrying at least a current symbol and a trailing symbol over a system exhibiting channel memory, the current symbol being received before the trailing symbol, the current symbol being mapped to a current stage of a trellis and the trailing symbol being mapped to a next stage of the trellis;
a controller configured to select a subset of candidate states at the current stage of the trellis, the current stage of the trellis including the subset of candidate states and one or more remaining candidate states that are excluded from the subset of candidate states; and
a trellis equalizer coupled to the receiver and the controller, the trellis equalizer configured to compute a first set of accumulated path metrics (APMs) for the subset of candidate states at the current stage of the trellis without computing APMs for the one or more remaining candidate states at the current stage of the trellis such that APMs are computed for fewer than all states at the current stage of the trellis, and to decode the trailing symbol using at least the APMs for the subset of candidate states of the current stage of the trellis.

11. A method for reduced state trellis equalization, the method comprising:
receiving, by a receiver comprising one or more processors, a current symbol and a trailing symbol over a system exhibiting channel memory, the current symbol being received before the trailing symbol, the current symbol being mapped to a current stage of a trellis and the trailing symbol being mapped to a next stage of the trellis;
computing, by at least one of the processors in the receiver, accumulated path metrics (APMs) for candidate states at the current stage of the trellis;
identifying, by at least one of the processors in the receiver, a maximum likelihood (ML) state of the current stage based on the APMs;
selecting, by at least one of the processors in the receiver, a subset of candidate states based on a neighborhood map of the ML state without sorting APMs of neighboring candidate states of the ML state following identification of the ML state, the current stage of the trellis including the subset of candidate states and one or more remaining candidate states excluded from the subset of candidate states; and
decoding, by at least one of the processors in the receiver, the trailing symbol at the next stage of the trellis using APMs of the subset of candidate states of the current stage of the trellis without using APMs of the one or more remaining candidate states excluded from the subset of candidate states.

12. The method of claim 11, wherein the subset of candidate states includes the ML state and one or more of the neighboring candidate states identified as highest probability neighbors of the ML state by the neighborhood map.

13. A receiver comprising:
a processor; and
a non-transitory computer readable storage medium storing programming for execution by the processor, the programming including instructions to:
receive a current symbol and a trailing symbol over a system exhibiting channel memory, the current symbol being received before the trailing symbol, the current symbol being mapped to a current stage of a trellis and the trailing symbol being mapped to a next stage of the trellis;
compute accumulated path metrics (APMs) for candidate states at the current stage of the trellis;
identify a maximum likelihood (ML) state of the current stage of the trellis based on the APMs;
select a subset of candidate states based on a neighborhood map of the ML state without sorting APMs of neighboring candidate states of the ML state following identification of the ML state, the current stage of the trellis including the subset of candidate states and one or more remaining candidate states excluded from the subset of candidate states; and
decode the trailing symbol at the next stage of the trellis using APMs of the subset of candidate states of the current stage of the trellis without using APMs of the one or more remaining candidate states excluded from the subset of candidate states.

14. The receiver of claim 13, wherein the subset of candidate states includes the ML state and one or more of the neighboring candidate states identified as highest probability neighbors of the ML state by the neighborhood map.

15. A method for reduced state trellis equalization, the method comprising:
determining, by a receiver comprising one or more processors, metrics of a channel exhibiting channel memory;
generating or updating, by at least one of the processors in the receiver, a neighborhood map based on the metrics of the channel, the neighborhood map associating a subset of candidate states at a current stage of a trellis with a maximum likelihood (ML) state without associating one or more remaining candidate states at the current stage of the trellis with the ML state such that fewer than all candidate states at the current stage of the trellis are associated with the ML state;
receiving, by the receiver, a signal carrying at least a current symbol and a trailing symbol over the channel, the current symbol being received before the trailing symbol; and
performing, by at least one of the processors in the receiver, reduced-state trellis equalization on the current symbol and the trailing symbol in accordance with the neighborhood map.

16. The method of claim 15, wherein performing reduced-state trellis equalization on the current symbol and the trailing symbol in accordance with the neighborhood map comprises:
- mapping the current symbol to the current stage of the trellis and the trailing symbol to a next stage of the trellis;
- determining that the ML state is associated with the current stage of the trellis;
- selecting a subset of candidate states at the current stage of the trellis based on the neighborhood map, the current stage of the trellis including the subset of candidate states and one or more remaining candidate states that are excluded from the subset of candidate states;
- computing accumulated path metrics (APMs) for the subset of candidate states without computing APMs for the one or more remaining candidate states; and
- decoding the trailing symbol using at least the APMs for the subset of candidate states of the current stage of the trellis.

17. The method of claim 15, wherein generating the neighborhood map based on the metrics of the channel comprises:
- determining distances between candidate states and the ML state;
- computing weights for the candidate states based on the metrics of the channel;
- applying the weights to the distances to obtain weighted distances between the candidate states and the ML state; and
- generating the neighborhood map based on the weighted distances, wherein the neighborhood map identifies the subset of candidate states as those candidate states having the shortest weighted distance.

18. A receiver comprising:
- a processor; and
- a non-transitory computer readable storage medium storing programming for execution by the processor, the programming including instructions to:
  - determine metrics of a channel exhibiting channel memory;
  - generate or update a neighborhood map based on the metrics of the channel, the neighborhood map associating a subset of candidate states at a current stage of a trellis with a maximum likelihood (ML) state without associating one or more remaining candidate states at the current stage of the trellis with the ML state such that fewer than all candidate states at the current stage of the trellis are associated with the ML state;
  - receive a signal carrying at least a current symbol and a trailing symbol over the channel, the current symbol being received before the trailing symbol; and
  - perform reduced-state trellis equalization on the current symbol and the trailing symbol in accordance with the neighborhood map.

19. The receiver of claim 18, wherein the instructions to perform reduced-state trellis equalization on the current symbol and the trailing symbol in accordance with the neighborhood map includes instructions to:
- map the current symbol to the current stage of the trellis and the trailing symbol to a next stage of the trellis;
- determine that the ML state is associated with the current stage of the trellis;
- select a subset of candidate states at the current stage of the trellis based on the neighborhood map, the current stage of the trellis including the subset of candidate states and one or more remaining candidate states that are excluded from the subset of candidate states;
- compute accumulated path metrics (APMs) for the subset of candidate states without computing APMs for the one or more remaining candidate states; and
- decode the trailing symbol using at least the APMs for the subset of candidate states of the current stage of the trellis.

20. The receiver of claim 18, wherein the instructions to generate the neighborhood map based on the metrics of the channel include instructions to:
- determine distances between candidate states and the ML state;
- compute weights for the candidate states based on the metrics of the channel;
- apply the weights to the distances to obtain weighted distances between the candidate states and the ML state; and
- generate the neighborhood map based on the weighted distances, wherein the neighborhood map identifies the subset of candidate states as those candidate states having the shortest weighted distance.

* * * * *